US012214917B2

(12) United States Patent
Mills et al.

(10) Patent No.: US 12,214,917 B2
(45) Date of Patent: Feb. 4, 2025

(54) FILLING PROCESS WITH CELL-BY-CELL AUTOMATED COMPOUNDING

(71) Applicant: TESPO IP, LLC, Plymouth, MI (US)

(72) Inventors: Ted Matthew Mills, Novi, MI (US); Jeffrey Thomas Linton, Ann Arbor, MI (US); Chase Ryan Linton, Ann Arbor, MI (US); Justin Michael Gauvin, Waltham, MA (US)

(73) Assignee: Tespo IP, LLC, Plymouth, MI (US)

( * ) Notice: Subject to any disclaimer, the term of this patent is extended or adjusted under 35 U.S.C. 154(b) by 262 days.

(21) Appl. No.: 17/620,998

(22) PCT Filed: Jun. 18, 2020

(86) PCT No.: PCT/US2020/038467
§ 371 (c)(1),
(2) Date: Dec. 20, 2021

(87) PCT Pub. No.: WO2020/257477
PCT Pub. Date: Dec. 24, 2020

(65) Prior Publication Data
US 2022/0324592 A1 Oct. 13, 2022

Related U.S. Application Data

(60) Provisional application No. 62/862,819, filed on Jun. 18, 2019.

(51) Int. Cl.
*B65B 3/00* (2006.01)
*A61J 7/00* (2006.01)
(Continued)

(52) U.S. Cl.
CPC ............. *B65B 3/003* (2013.01); *A61J 7/0084* (2013.01); *B65B 1/06* (2013.01); *B65B 1/32* (2013.01);
(Continued)

(58) Field of Classification Search
CPC . B65B 5/103; B65B 3/06; B65B 3/003; A61J 7/0076; A61J 7/0084; B65D 83/0454; B65D 83/06
See application file for complete search history.

(56) References Cited

U.S. PATENT DOCUMENTS

2003/0127463 A1* 7/2003 Varis ...................... G16H 20/13 221/13
2004/0094564 A1* 5/2004 Papp ...................... G06V 20/66 221/25
(Continued)

FOREIGN PATENT DOCUMENTS

WO WO-0006018 A1 * 2/2000 ........... A61B 5/0022
WO 2016126904 A1 8/2016

OTHER PUBLICATIONS

International Search Report and Written Opinion for Application No. PCT/US2020/038467, dated Sep. 2, 2020, 10 pages.
(Continued)

*Primary Examiner* — Timothy P. Kelly
(74) *Attorney, Agent, or Firm* — Brooks Kushman P.C.

(57) ABSTRACT

A method for filling a pod is provided. A pod is provided and has a housing defining a plurality of serving chambers arranged in an annular array and surrounding a drive hub. Data is received that is indicative of a customized nutritional supplement for the pod to a controller of an automated filling station. The customized nutritional supplement is filled into at least one of the plurality of serving chambers of the pod via the automated filling station by controlling a plurality of hoppers of the filling station to dispense the customized supplement into the plurality of serving chambers of the pod. Each hopper contains a corresponding ingredient available for the customized supplement.

19 Claims, 26 Drawing Sheets

(51) Int. Cl.

| | |
|---|---|
| ***B65B 1/06*** | (2006.01) |
| ***B65B 1/32*** | (2006.01) |
| ***B65B 1/36*** | (2006.01) |
| ***B65B 3/06*** | (2006.01) |
| ***B65B 3/28*** | (2006.01) |
| ***B65B 3/30*** | (2006.01) |
| ***G07F 17/00*** | (2006.01) |

(52) U.S. Cl.

CPC .................. *B65B 1/36* (2013.01); *B65B 3/06* (2013.01); *B65B 3/28* (2013.01); *B65B 3/30* (2013.01); *G07F 17/0092* (2013.01); *A61J 2200/74* (2013.01); *A61J 2205/10* (2013.01)

(56) References Cited

U.S. PATENT DOCUMENTS

| | | | | |
|---|---|---|---|---|
| 2009/0281657 | A1* | 11/2009 | Gak | G07F 17/0092 700/242 |
| 2015/0088304 | A1* | 3/2015 | Ameye | A23L 33/135 700/233 |
| 2016/0280454 | A1* | 9/2016 | Mills | B65D 25/28 |
| 2018/0064608 | A1* | 3/2018 | Hines | A61J 7/0092 |

OTHER PUBLICATIONS

International Preliminary Report on Patentability for Application No. PCT/US2020/038467, dated Dec. 21, 2021, 9 pages.

* cited by examiner

| | Serving chamber 1 | 2 | 3 | 4 | 5 | 6 | 7 | 8 | 9 | 10 | 11 | 12 |
|---|---|---|---|---|---|---|---|---|---|---|---|---|
| Part A | 10mg | 20mg | 30mg | 20mg | 10mg | 30mg | 10mg | 20mg | 30mg | 20mg | 10mg | 30mg |
| Part B | 90mg | 90mg | 75mg | 90mg | 90mg | 75mg | 90mg | 90mg | 75mg | 90mg | 90mg | 75mg |
| Part C | 30mg | --mg | 10mg | --mg | 30mg | 10mg | 30mg | --mg | 10mg | --mg | 30mg | 10mg |
| Part D | 15mg | 10mg | 15mg | 10mg | 15mg | 15mg | 15mg | 10mg | 15mg | 10mg | 15mg | 15mg |
| Part E | 25mg | 25mg | 50mg | 25mg | 25mg | 50mg | 25mg | 25mg | 50mg | 25mg | 25mg | 50mg |
| Part F | 5mg | 10mg | --mg | 10mg | 5mg | --mg | 5mg | 10mg | --mg | 10mg | 5mg | --mg |
| | 175mg | 155mg | 180mg | 155mg | 175mg | 180mg | 175mg | 155mg | 180mg | 155mg | 175mg | 180mg |

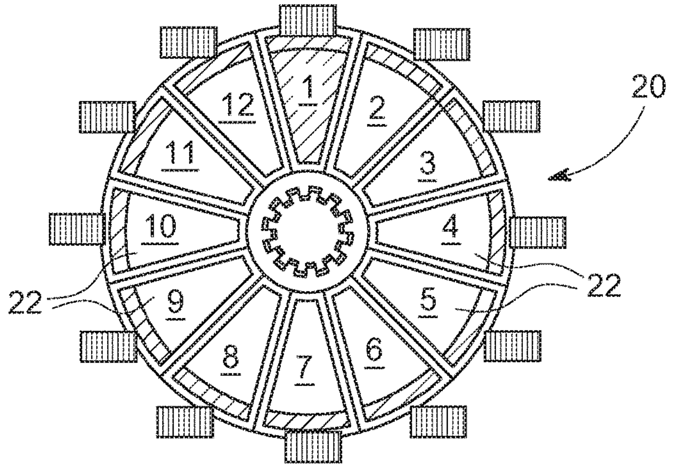

| | Day 1 | Day 2 | Day 3 | Day 4 |
|---|---|---|---|---|
| Morning | Serving chamber 1 | Serving chamber 4 | Serving chamber 7 | Serving chamber 10 |
| Midday | Serving chamber 2 | Serving chamber 5 | Serving chamber 8 | Serving chamber 11 |
| Night | Serving chamber 3 | Serving chamber 6 | Serving chamber 9 | Serving chamber 12 |

FIG. 4

FILLING PROCESS WITH CELL-BY-CELL AUTOMATED COMPOUNDING

CROSS-REFERENCE TO RELATED APPLICATIONS

This application is the U.S. national phase of PCT Application No. PCT/US2020/038467 filed Jun. 18, 2020, which claims the benefit of U.S. provisional application Ser. No. 62/862,819 filed Jun. 18, 2019, the disclosures of which are hereby incorporated in their entirety by reference herein.

BACKGROUND

The traditional market for the manufacture and intake of dietary formulas are most often produced but not limited to a tablet, gummy or capsule form. Pills and capsules are difficult for many people to swallow and/or digest. Manufacturing of such dietary formulas in pill/tablet form requires the use of fillers and/or binding agents in order w produce a tablet that is solid and has an acceptable shelf life. Manufactured tablets or capsules can be often large which tends to limit the amount of active ingredient content per delivery form and results in some efficacious dosages requiring multiple pills or tablets. Many consumers will avoid or are unable to take large pills, which leaves the consumer with few attractive alternatives.

The dietary formula industry has tried to address this issue by providing rapidly dissolving tablets and gummies, chewable tablets. Dietary formulas in dissolving tablet or chewable form have many of the same negative attributes of capsules and tablets, such as they typically contain fillers, sugars or binding agents which limit the amount of active ingredient content. The excessive use of fillers and binding agents resists digestion in the human (or animal) body; numerous studies have concluded that pill-form vitamins with even moderate amounts of fillers and/or binding agents can pass through the human digestive system with only a fraction of the active ingredients having been absorbed in the body. Gd-type tablets have been developed to help address the absorption issues, but tend to be even larger and more difficult to swallow especially for those who suffer with esophageal dysphagia. These large form factors can adversely influence the behavior of a consumer resulting in non-adherence issues.

Swallowing large pills, and even small pills for some, are difficult for many people. Those who are elderly, those with throat conditions, and children typically experience the most discomfort ingesting pill/tablet form dietary formulas. And in addition to humans, many conscientious pet owners would like to provide dietary formulas to their dog or cat or horse or other valued animal. Some pets will resist taking a dietary formula in pill-form, regardless of pill size. And some animals have a more rapid digestive through-part than humans, making pills with substantial amounts of fillers and binding agents even less effective by passing through the animal's body before a sufficient load of the active ingredients having been absorbed.

Another issue with prior art dietary tornados relates to correct dosing. As many dietary formulas are sold "over-the-counter", many consumers will form a subconscious understanding that the dietary formulas do not need to be taken with the same high level of care as they might otherwise give to prescription medicines. As an effect of this subconscious belief, the overage consumer may not be as concerned about missing a daily dose, or perhaps at the other extreme of taking two doses when only one is recommended. For example, a busy or distracted person might not recall if they had taken their vitamin pill that day. This person might think "No big deal, I will take one tomorrow". Or they might think, "No big deal, I will take another pill just to be safe", In both cases, the person runs the risk of either over-dosing or under-dosing their intake of the dietary supplement. Of course, pills boxes and the like have been developed to help organize pill consumption for people, but such are normally used for prescription medicines only and require a high degree of discipline to use regularly.

Life Boost, Inc. of Plymouth, Michigan, USA, the Applicant of this present invention, has developed a granulated nutritional formula dispensing machine configured to extract single-serving doses from a multi-serving formulas cartridge for delivery as a drinkable solution, which is marketed under the brand name TESPO®. This product is detailed in US Patent Publication No. 2016/0280454, published Sep. 29, 2016. The entire disclosure of US 2016/0280454, including all priority filings, is hereby incorporated by reference and relied upon. An image of the TESPO® machine is shown in FIG. 1A. The TESPO® machine utilizes a multi-celled formulas cartridge, or pod, 20 that is automatically indexed so that an unopened serving chamber 22 is presented each time for extracting its formulas S. Upon command, a lead serving chamber 22 is pierced so that its contents S drain into a mixing cup 24 together with a metered quantity of water from an integrated water tank. A vibrator unit assists drainage of the loose materials S from the lead serving chamber. The mixing cup 24 is spun on an inclined turntable to blend the water and formulas S into a slurry.

This same company, Life Boost, Inc., has also developed and marketed a light-weight dispensing lid to enable manual extraction of nutritional formulas S from the pod 20 for travel applications, which is marketed under the brand name TESPO-GO™. This product is detailed in PCT Patent Publication No. WO 2016/126904, published Aug. 11, 2016. The entire disclosure of WO 2016126904, including all priority filings, is hereby incorporated by reference and relied upon. An image of the TESPO_GO™ dispensing lid operatively coupled to a formulas pod 20 is shown in FIG. 1B.

There is a need in the art for an improved systems and methods to compound formulations for dietary formulas. In particular, the improved systems and methods must be amenable to a broadened range of formula compositions and states e.g., powders, granules, beadlets/pellets, pills, tablets, liquids, gels, and the like), and for use with varying formulas, or multiple or mixed formulas. The improved systems and methods must be conducive to serving-to-serving variability but yet not be susceptible to cross-contamination. The improved systems and methods should easily accommodate segregation of certain components that nevertheless are intended for concurrent consumption in a single to multiple dose servings. Furthermore, the improved systems and methods may be conducive to customized formula compounding by the user or a care-giver/physician.

SUMMARY

The systems and methods for compounding nutritional formulas of this invention includes point-of-fill custom-compounding each serving chamber of a pod, sachet, or the like having one serving chamber or multiple serving chambers.

According to an embodiment, a method for filling a pod is provided. A pod is provided and has a housing defining a plurality of serving chambers arranged in an annular array and surrounding a drive hub. Data is received that is indicative of a customized nutritional supplement for the pod to a controller of an automated filling station. The customized nutritional supplement is filled into at least one of the plurality of serving chambers of the pod via the automated filling station by controlling a plurality of hoppers of the filling station to dispense the customized supplement into the plurality of serving chambers of the pod. Each hopper contains a corresponding ingredient available for the customized supplement.

BRIEF DESCRIPTION OF THE DRAWINGS

FIG. 4 illustrates a schematic of a pod and dosages in various serving chambers according to an example;

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various embodiments of the present disclosure and of the invention relate generally to a system and method for providing a custom-formulated powder-form and/or granulated and/or oil form, pill/tablet-form and/or beadlet-form and/or liquid dietary formulas and/or pharmaceuticals in measured doses or any other ingestible material that may be fit into a serving chamber of a pod or other serving item, such as a sachet. As used herein, a pod may also include a sachet such as a stick pack, blister pack, bag, cell, cap with a dispensable formula, bottle, vial, or individual cartridge. As used herein, the terms dietary formula and nutritional supplement, and the abbreviated forms "supplements" and "formulas," are used more or less interchangeably. Both terms are intended to broadly define any and all types of pills, tablets, gummies, gels, liquids, granulars, beadlets, oils, powders, nutraceuticals, vitamins, minerals, fibers, fatty acids, proteins, amino acids, effervescents, herbal medicines, bodybuilding formulas, pharmaceuticals, therapeutics, medicines, pet products, drugs, treatments and any other like substance that is ingested or non-ingested for useful purposes. Formulas is also intended to broadly include foods for humans, animals and plants.

Referring to the figures, wherein like numerals indicate like or corresponding parts throughout the several views, a pod is generally shown at 20 throughout the views in various exemplary configurations. The pod 20 has multiple serving chambers 22 arranged in an annular array to accommodate rotary indexing from one serving chamber 22 to the next. In the illustrated examples, all of the serving chambers 22 in the pod 20 are of identical size and shape, Each has a truncated sector-shape radiating from a central drive hub. The drive hub is adapted to interface with a rotary drive shaft like that described, for example, in the aforementioned US 2016/0280454. However, in some contemplated embodiments the serving chambers 22 are of unequal size/shape and in some embodiments the central drive hub is omitted in favor or an external or circumferential drive interface (not shown) or none at all.

Figure 2:
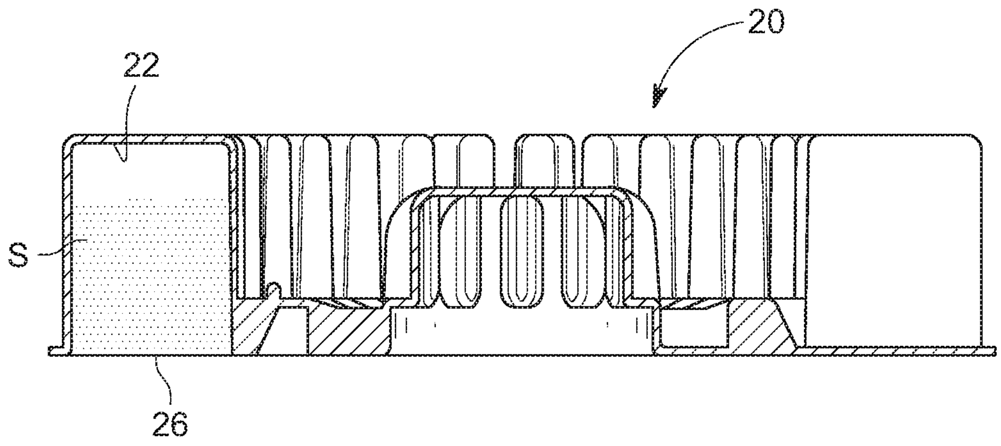
FIG. 2 illustrates a cross-sectional view of a pod according to an example.

A cross-sectional view of an exemplary pod 20 is shown in FIG. 2. The serving chambers 22 are designed for universal use, in terms of the types and forms of formulas S that can be dispensed. For example, the nutritional formulas S could be of anyone or more of the following types: active ingredients, flavoring, special agents, foods (e.g., teas and spices), agitation agents (e.g., effervescents), pills/tablets, and so forth, and includes formulas as described above in their various forms. In terms of form, the nutritional formulas S capable of use in the pod 20 include, but are not limited to: powders, granules, beadlets/pellets, liquids, oils, pills, capsules, and the like. It must be understood that the forms and types and compositions of formulas S mentioned here are for purposes of illustration only, and are not intended to represent exhaustive lists. The top of each serving chamber 22 is closed (or capable of being sealed closed) with a foil membrane 26, lid, cap, door, valve, or other suitable sealing device that may be selectively opened to dispense S. The pod may therefore be sealed in an air tight and leak tight manner. Other suitable sealing devices or techniques may include, but are not limited to, heat seals, plastic wrap seals, foil seals, crimped seals, laser seals, press fit seals, hermetically seals, ion bond seals, ultrasonic welds, UV welds, plastic welding seals, twist on seals, hinge enclosures, snap fit sealing members, press fit sealing members, and the like.

| | Amount per serving |
|---|---|
| Vitamin A (as Vitamin A Palmitate) | 2500 IU |
| Vitamin C (Ascorbic Acid) | 100 IU |
| Vitamin D3 (as Cholescalciferol) | 800 IU |
| Vitamin E (as D-Alpha Tocopheryl Succinate) | 15 IU |
| Vitamin K1 (as Phytonadione) | 80 mcg |
| Vitamin B1 (as Thiamin HCl) | 1.5 mcg |
| Vitamin B2 (as Riboflavin-5-Phosphate) | 1.7 mcg |
| Niacin (as Niacinamide) | 10 mcg |
| Vitamin B6 (as Pyridoxal-5-Phosphate) | 2 mcg |
| Folate (as L-Methylfolate) (METAFOLIN) | 400 mcg |
| Vitamin B12 (as Methylcobalamin) | 100 mcg |
| Biotin | 300 mcg |
| Pantothenic Acid (as Calcium Pantothenate) | 10 mcg |
| Iodine (as Potassium Iodide) | 150 mcg |
| Magnesium (as Magnesium Lactate) | 20 mcg |
| Selenium (as Selenomethionine) | 20 mcg |
| Maganese (as Maganese Amino Acid Chelate) | 2 mcg |
| Chromium (as Chromium Polynicotintate | 120 mcg |
| Molybdenum (as Sodium Molybdate) | 37 mcg |
| Boron (as Boron Citrate)) | 80 mcg |
| CoQ10 (ALL-Q) | 25 mcg |
| Lutein (FLORAGLO) | 10 mcg |
| Zeaxanthin (OPTISHARP) | 2 mcg |

Figure 3:
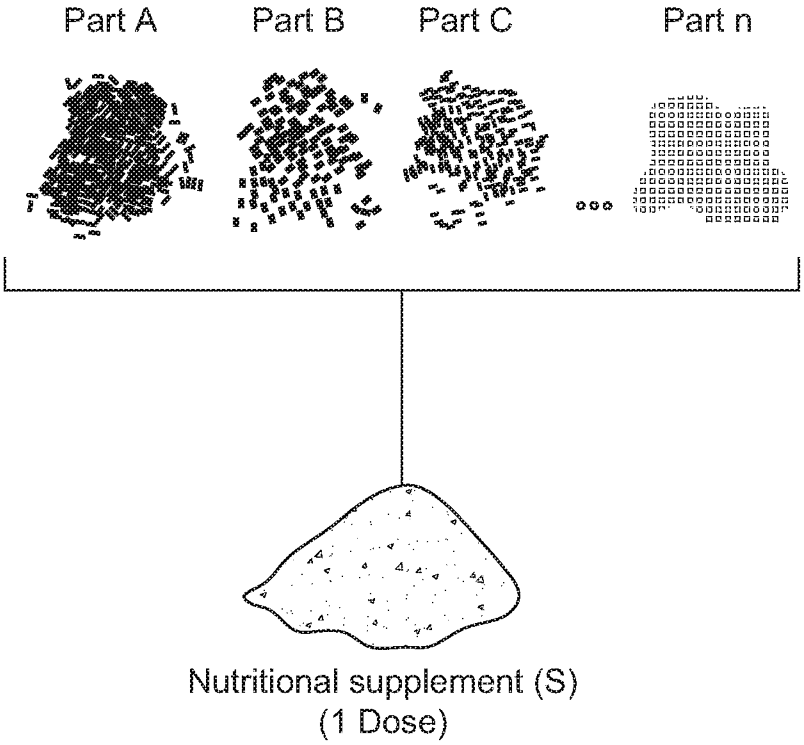
FIG. 3 illustrates a schematic of a formula S.

As suggested in connection with FIG. 3, the formula S may be formulated as a compound—that is, a blend of one or more different ingredients. The formula S may be provided as a mixed blend of multiple compounds or ingredients in various forms, as layers of different compounds or ingredients in various forms, or as a combination thereof. The formula S may alternatively be provided as a single ingredient. These different ingredients or compounds are labeled generically as Part A, Part B, Part C . . . Part n to suggest that the number of separate elements can be any number. As but one very specific example, the ingredients for one formulas S dose may be formulated as a twenty-three part compound of supplements and/or pharmaceuticals as shown in the table above. Furthermore, the formula S dose may include any number of compounds in different forms, e.g. as a combination of a powder and a granule.

According to one exemplary embodiment of this invention, the constituent Parts A-n of the active ingredients A are each manufactured in the form of beadlets. For the avoidance of doubt, the term "beadlet" is intended to very broadly include all forms of micro-beads, powders, spheres, grains, pellets and extrusions and other manner of intentionally-shaped compositions. Beadlets may range in size from a minimum below 1.01 mm to over 5.0 mm in diameter. Beadlets may be uniform in shape, size, weight or may vary. Any combination of some or all of the ingredients within the formula S composition can be in the form of beadlets.

Beadlets offer many advantages within the context of dietary formulas and/or pharmaceuticals consumed in measured doses by mixture with water (or other liquid or no liquid). One such advantage is that because of the reliably-consistent flow properties of the beadlet form, the active ingredients A can be very accurately processed through filling machinery.

According to another embodiment of the invention, the constituent Parts A-n of the active ingredients are provided in pill or capsule form, for example, as pharmaceuticals. Any combination of some or all of the ingredients within the formula S composition or supplement can be in the form of pills or capsules. In a further example, the formula. S may include all of the various pill(s) and/or capsules that a user is scheduled to take at a time, e.g. that day, or that time of day, and in the prescribed dosages.

FIG. 4 shows an exemplary pod 20 having twelve (12) serving chambers 22. For illustrative purposes, each serving chamber 22 is labeled #1-#12 in this Figure. Serving chamber #1 is shown with a darker background as may be helpful to correlate with subsequent Figures. FIG. 4 also shows a unique identifier, in the exemplary form of a barcode, associated with each serving chamber 22. The barcode is used throughout the figures to represent any suitable type of unique identifier including, but not limited tea, QR codes, barcodes, RFID, codex, script, electrical strip, metal indexing, punched out or raised material markings or indicia on the pod, other types of codes, writings, and the like.

The unique identifier contains detailed specifications for the formulas S contained in the associated serving chamber 22 and said pod or sachet. That is to say, one unique identifier corresponds to a specific serving Chamber 22 in the pod 20. Thus, a pod 20 having twelve (12) serving chambers 22 will be provided with twelve (12) unique identifiers. (Of course, the number twelve is merely an example. Pods 20 may have any number chambers). Alternatively, the entire pod 20 may have only one (1) unique identifier containing detailed specifications for all of the formulas S in all serving chambers 22. A marker device may be present to identify a lead serving chamber or point-of-reference on the pod 20 from which each serving chamber 22 can be located by orienting the pod 20 in relation to the marker. In whatever manner is most suitable, therefore, each serving chamber 22 is separately filled with formulas S, such that the ingredient composition is variable from one serving chamber 22 to the next, e.g. some or all of the formulas S in the serving chambers may be different from one another. This may also be the same where formula S does not vary from one serving chamber to the next; e.g. all chambers could be filled with all the same ingredients. According to a further example, the formulas S may be provided into each serving Chamber with the compounds or ingredients in each chamber being layered to provide the resulting overall formula S dose in each serving chamber of a pod or sachet.

Continuing in the highly-simplified example of FIG. 4, a particular pod 20 may be custom-filled for a user that requires multiple distinctly different doses of formulas S per day. For the sake of illustration, let us assume that each dose is composed of a specified combination of ingredient Parts A-F. In this example, one dose composition is to be taken each day at Morning time; a second dose composition is to be taken at Midday; and a third dose composition is to be taken at Evening. A table at the top of FIG. 4 shows the exact combination of ingredients or formulas (e.g. powders, pills, tablets, beadlets, etc.) in each serving chamber by weight or count. Of course, this is highly-simplified example in serving chamber #1, the composition of ingredients or formulas amounts to 175 mg. In serving chamber #2, the composition of ingredients amounts to 155 mg. In serving chamber #3, the composition of ingredients amounts to 180 mg. This sequence is repeated for serving chambers #4-12. This is one example; in other scenarios the same composition and dosage may be used consistently in all of the chambers.

Figure 1A:
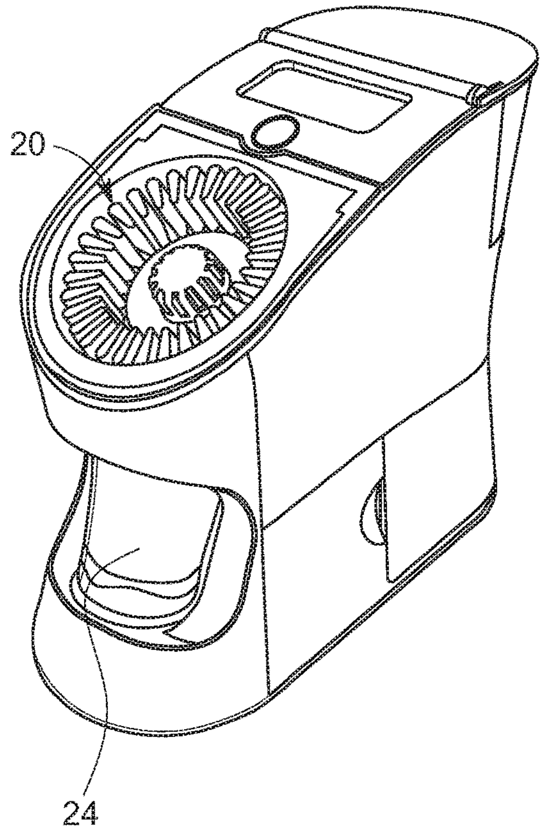
FIG. 1A (PRIOR ART)
FIGS. 1A and 1B illustrate a dispensing machine and a dispensing lid for a pod, respectively.
Figure 1B:
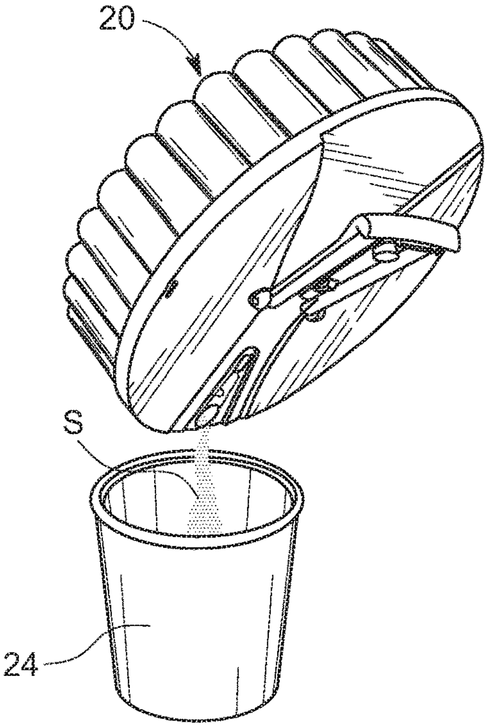
FIG. 1B (PRIOR ART)

In use, the user is expected to place the pod 20 in a dispenser machine like that shown, for example, in FIG. 1A, or in the alternative to manually dispense doses as suggested in FIG. 1B or other format having a circular pod cartridge or sachet. When using a dispenser machine as in FIG. 1A, an integrated sensor will scan the unique identifier, in this example one or more barcode(s) and orient the pod 20 so that the correct serving chamber 22 will be evacuated at the appropriate time of day. Thus, for example, if the user first places the unused pod 20 into a dispensing machine (FIG. 1A) at midday and initiates a dosage dispensing protocol, the machine programming will orient the pod 20 so that the first available "Midday" serving chamber 22 (i.e., serving chamber #2) is selected for evacuation. The dispensing of formula S from serving chamber #2 may be recorded to the dispenser machine and/or to the cloud for monitoring purposes for compliance of use. A similar, albeit manual, scenario could occur in the case of a manually dispensed dosage as per FIG. 1B.

It will be appreciated, that the exemplary pod 20 with twelve (12) serving chambers 22 will provide twelve (12) individual doses when a complete dose is contained in each serving Chamber 22. (FIGS. 11-12 describe an embodiment of the invention in which one dose is spread over two or more serving chambers 22.) At three (3) doses per day, a pod 20 having twelve (12) serving chambers 22 will last four (4) days, as shown in the table at the bottom of FIG. 4. Of course, the pod 20 may be designed to have any number of serving chambers 22, with the number twelve used only for convenience in these illustrations. Naturally, a pod 20 having more than twelve serving chambers 22 will provide opportunity for a greater number of doses, but at the sacrifice of volumetric capacity given the same overall pod 20 dimensions. The pods 20 shown in FIGS. 11-12 have thirty-one (31) serving chambers 22. To reiterate, a pod 20 can be crafted with any number of serving chambers 22, and it is not necessary that all serving chambers 22 be of equal dimension. And furthermore, all of the serving chambers 22 may or may not be filled with the same formula. S and/or dosage.

Figure 5:
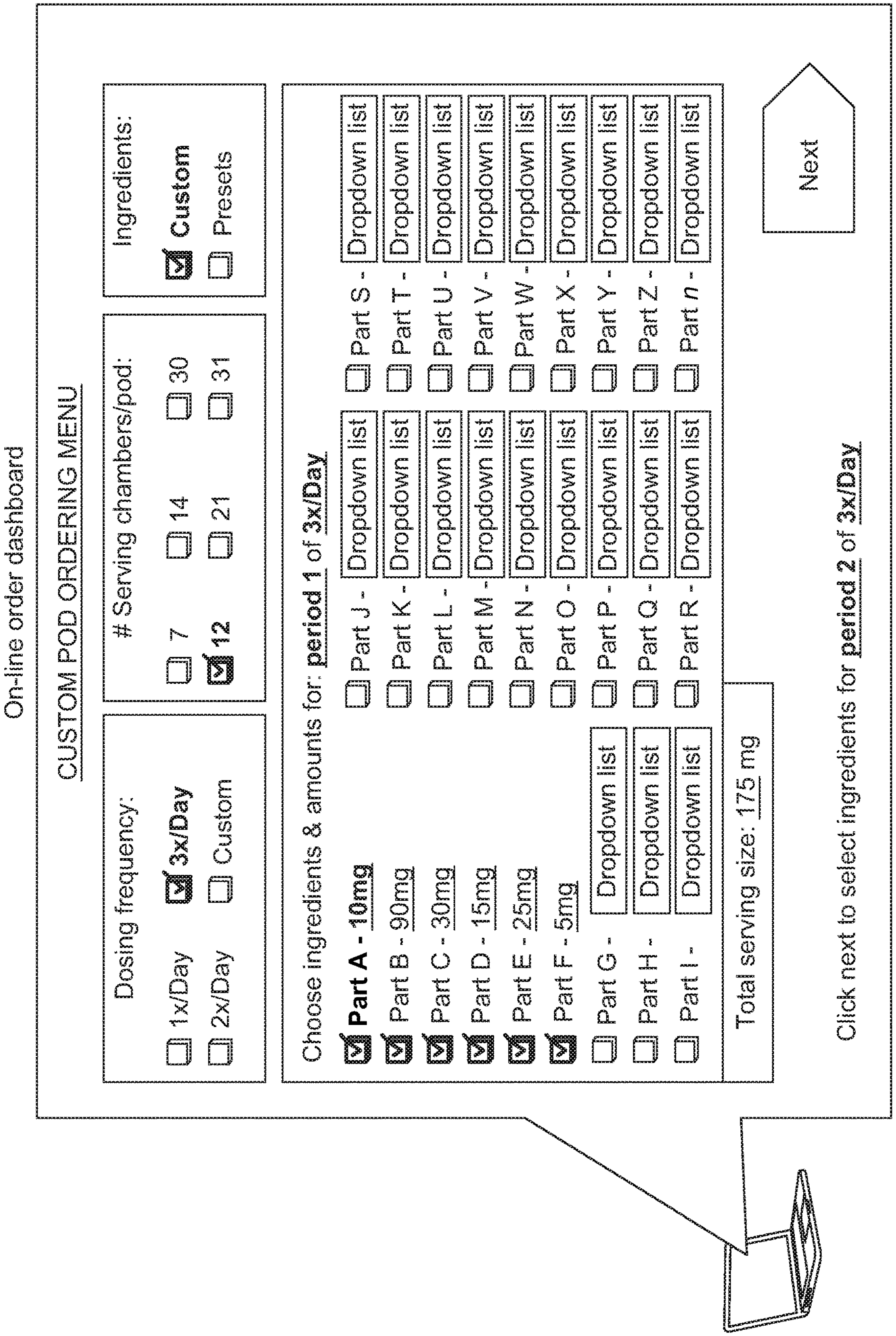
FIG. 5 illustrates a simplified dashboard or ordering interface according to an example.

In practice, it is desirable that a user (or a user's care-giver/physician, etc.) be able to customize the pod 20 by selecting the ingredients for each dose. FIG. 5 provides a highly simplified example of an ordering interface or dashboard such as might be provided via on-line access from a mobile device, computer terminal, application, or physical location via retail, vending machine, hospital or pharmacy. The user provides information about themselves (or another in the case of care-giver/physician ordering) or based on an individual's medical record, blood tests, medical devices, connected wearable devices, IoT (Internet-of-things) devices from the home or car, and/or questionnaire information into a Dashboard. The Dashboard provides inputs to provide individual ingredient or formula options the user may select to add into their individual serving chambers 22 in a pod 20 or sachet, and the Dashboard may further incorporate machine learning and/or artificial intelligence to provide the options or better predict options for a user. Naturally, GMP and FDA requirements safety warnings and recommendations (e.g., to consult with medical caregiver prior to ordering, etc.) are omitted from the simplified schematic dashboard in FIG. 5.

In this example, the selection of ingredients corresponds to the table presented in the preceding FIG. 4. The selected Dosing Frequency is 3×/Day (three times per day). The pod 20 is identified as having twelve (12) serving chambers 22. The user desires to custom-select ingredients, as compared with selection of certain preset formulations that may be offered (e.g., Men's Heath, Condition Specific, Energy, etc.) In the custom-select menu as shown, Ingredient "Part A" might, for example, represent a single homogeneous element like Vitamin A, Vitamin C or Magnesium, or instead represent a pre-mixed blend of nutritional formulas S, flavors, etc. Each Ingredient may alternatively be provided by a pill or capsule, for example when the formula S relates to pharmaceuticals or therapeutics. The User selects the designed ingredient parts and also selects the amount of each from a Dropdown List provided. The Dropdown List will contain minimum and maximum selection amounts for each ingredient, with gradations and/or volume corresponding to the metering capability of the filling equipment. That is to say, if the filling equipment for ingredient Part. D is configured to dispense in 5 mg increments, and if the maximum recommended dosage for ingredient Part D is 20 mg, then the Dropdown List associated with ingredient Part D will be: 0-5 mg-10 mg-15 mg-20 mg. The software programming associated with the ordering dashboard can be designed to want, flag or prevent problematic combinations of ingredients that a user might wish to select backed by creditable sources and/or block chain technology enabling from ordering and consuming conflicting formulas combined with users provided information about themselves that could impact the users health. For example, the programming logic may prohibit mixing a desired quantity of Part X with the desired quantity of Part Y because these parts combined in these quantities would not be safe to ingest. All ingredients and drop down list items can be reprogrammed and updated to account any variations of granulation size, volume, count or weight.

Figure 6:
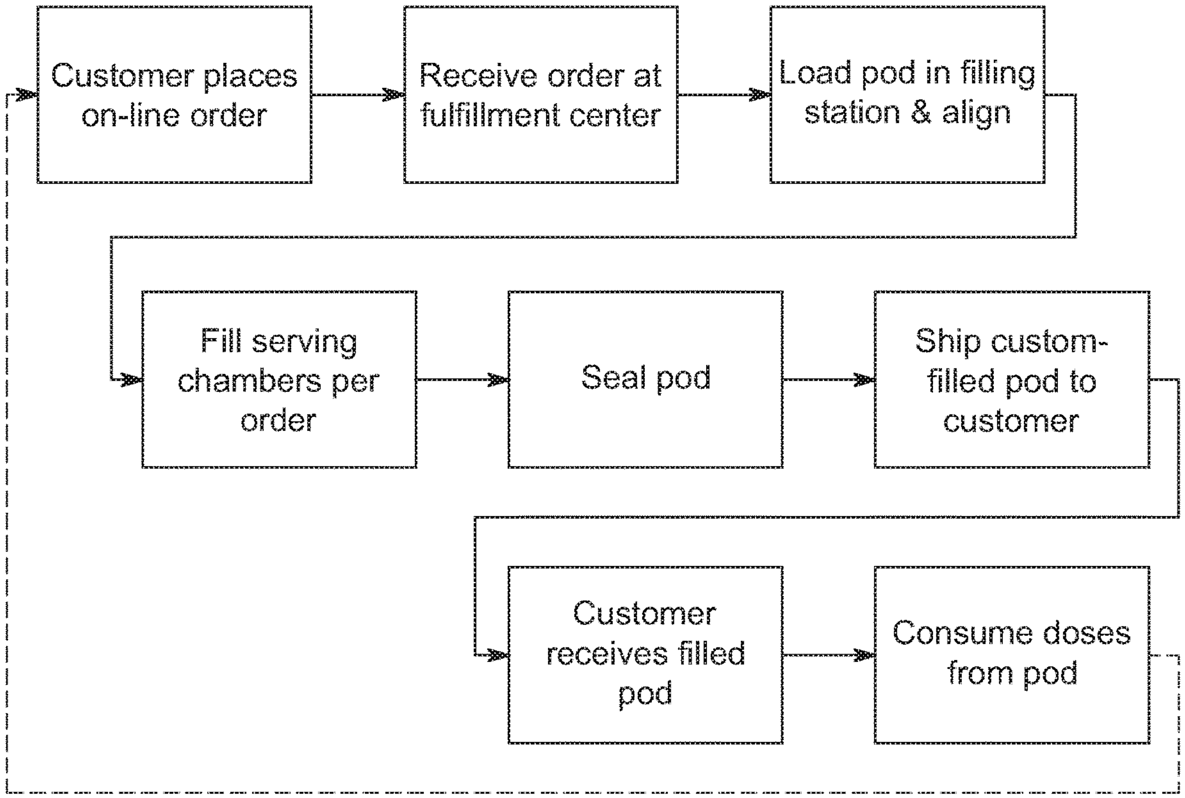
FIG. 6 illustrates a simplified schematic of a pod ordering process according to an example.

A simplified schematic of the pod 20 ordering process is shown in FIG. 6. A user (or care-giver/physician) places an order using, for example, an interface like than depicted in FIG. 5. The order is directed to an authorized and compliant production/fulfillment center, pharmacy location, hospital, co-packing facility etc. outfitted with food grade or pharmaceutical grade filling equipment specially configured to custom-fill serving chambers 22 in a pod 20 with all available ingredients (Parts A-n). Ingredients and raw materials will be checked into the authorized and compliant production/fulfillment center, pharmacy location, hospital, co-packing facility etc., accounted for into inventory. These ingredients and raw material are loaded into filling equipment at the appropriate time. A pod 20 will be loaded and programmed into the filling station to correspond with the user's indicated type of pod (e.g., 12-cell, 21-cell, etc.) as well as the individual ingredients and or premix formulas. The filling equipment aligns the pod 20 so that each serving chamber 22 can be oriented and/or associated with a specified cell number that correlates to the order specifications. (This may include reading the unique identifier(s) with a scanner or sensor 30, as suggested in FIGS. 7 and 8.) If all chambers are filled with the same ingredients, volumes and weights, each chamber would be all programmed as the same and thus activated in the order of operations and for a customer wanting the next cell would be rotated to the next unused. The filling equipment custom-fills each serving chamber 22 with the formulation of ingredients as specified in the order. The unique identifier(s) contain detailed information about the specific ingredient contents of each serving chamber 22 so that a dispenser machine (FIG. 1A or FIG. 1B) will be able to orient the pod 20 so that the correct serving chamber 22 will be evacuated at the appropriate time of day. An air tight seal 26 is affixed to the pod 20 (or to each serving chamber 22) when the filling operation is completed.

The finished pod 20 is provided or shipped to the customer, who then uses the pod 20 to extract formula S doses according to the predetermined dosing schedule (FIG. 4). At the appropriate time, the customer may place a new order to repeat the order-till-consume cycle or an automated recurring order may trigger.

It is contemplated that in some cases, an initial required step could insist that the user provide (e.g., upload) a personal medical record containing relevant measurements provided by a qualified caregiver/physician. Relevant measurements could include, but are not limited to, blood testing, urine testing, saliva testing, or any other testing. The measurements could be analyzed by the application programming to suggest what ingredients the customer should order (or control what ingredients the customer is permitted to order).

The filling process can be further explained as follows. A cleaned, empty pod 20 with multiple serving chambers 22 may be programmed at the assembly line to classify its formula contents. This pod 20 will flow through a series of manufacturing steps. Each step will be documented to track various details, including, but not limited to, date, time, the weight of components, type of ingredients, the weight of ingredients added, the weight of ingredients removed from supply, room temperature, room humidity, operators on site, quality operator validation, microbial bacteria testing, analytical testing, shelf life testing, heat testing, cold testing, pressure testing, etc.

Each serving chamber 22 will be filled using food grade, or pharmaceutical grade equipment to measure out a unique volume/weight/amount with various granulation size formulas and/or pill components. The filling equipment is adjustable based on the unique formula requested by the user (e.g., FIG. 4). Each pod 20 will be inspected on weight and provided with nutritional formula panel(s) based on the number of serving chambers 22 filled with that combination of ingredients and their associated weights added to each serving Chamber 22, with each serving chamber 22 of each pod 20 filled with the same formula or each serving chamber 22 filled with various cells. Each serving chamber 22 will be identified with the formula added to be eventually communicated to the user and dispenser (FIG. 1A). Each serving chamber 22 will then be closed air tight (e.g., with foil seal 26 or secure lid, film, same material as the pod or other materials) to protect the ingredients inside from air and environment conditions. Each pod 20 will be printed will an associated unique label, with the proper FDA statements, suggested use warning statements, as well as a MFG Date or EXP Date and Lot number, etc.

The unique identifier will be inputted and associated with the pod 20 and/or individual serving chambers 22 at any time during the filling process. The unique identifier can take many different forms, and be imbedded in the pod 20 or a sealing cap (FIG. 1B), applied through a separate plastic cap or top, sticker QR code, code, barcode, RFID, codex, script, electrical strip, etc.

Pods 20 will pass through the assembly and manufacturing equipment to be filled with single ingredients and/or premixed nutritional formulas S (including but not limited to candy pieces, oils, baking ingredients, pharmaceutical, powder, supplement, vitamin, animal supplements or foods, human foods, plant foods, formulas, loose leaf teas, body or beauty products, etc.). Pods 20 will be packaged, labeled, lotted with unique identifier, dated from time filled and/or time of expiration. The proper steps in the filling process will be documented in compliance to account for production inputs and outputs including weights of ingredients, quality assurance and to standard operating procedures.

The filling equipment may be provided according to the various embodiments as disclosed herein, and the filling equipment or filling station may be provided as a compact unit, such as a tabletop unit or the like for use in a pharmacy or medical office setting, or may be a larger unit suitable for use in a commercial production or fulfillment center. For compact filling equipment, the device may be provided with alt outer housing and a door, where the pod is positioned into the housing, the door is closed, and the pod is filled with the customized supplement.

Figure 7:
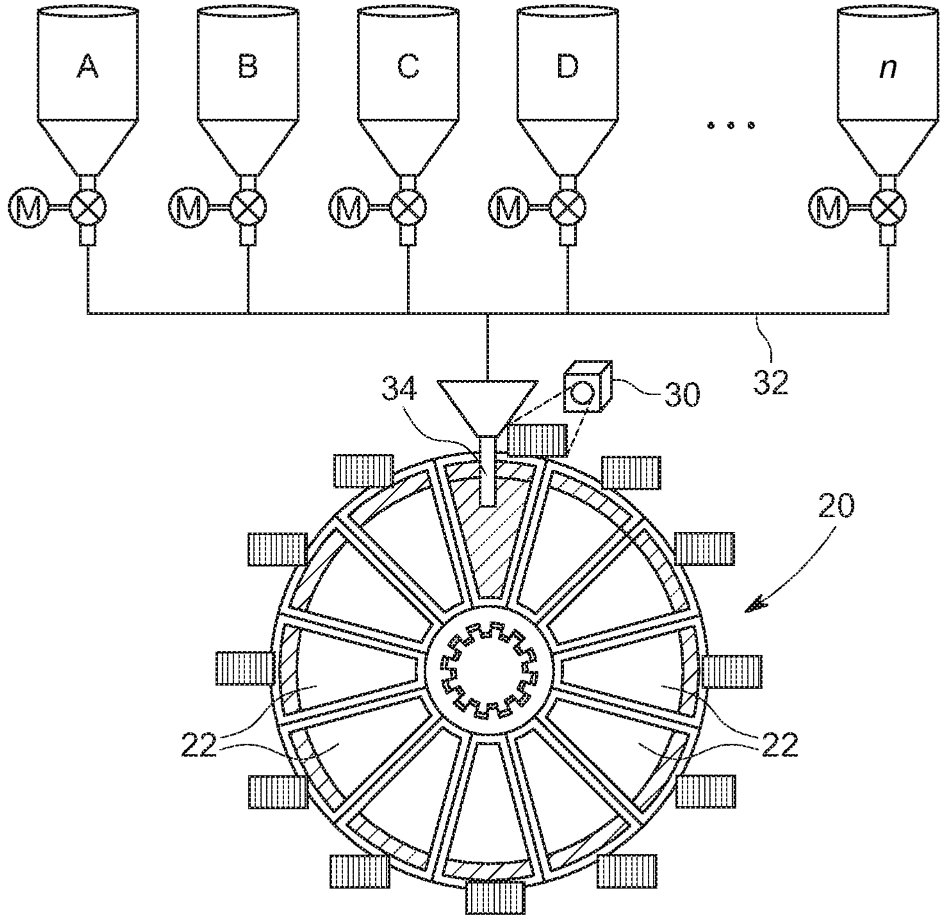
FIG. 7 illustrates a schematic of a filling process using hoppers according to an example.

FIGS. 7-10 depict various exemplary systems and assembly line arrangements for pods 20 according to this present invention. FIG. 7, for example, illustrates the filling process in the context of a select number of hoppers (A, B, C, D, . . . n), each hopper containing a corresponding one of the ingredient parts available for selection or premix of (ingredients, flavoring, etc.) (FIG. 5). As used in the present disclosure, a hopper includes a hopper, a gate, vibratory transfers, weight scale measuring, a volumetric cavity, a funnel, an air tube, a rotary dispenser, or the like where the hopper controls an amount of discharged ingredient by controlling the amount to feed into a single chamber, multiple chambers, a pod, a sachet, and/or multiple sachets. The hoppers feed a common manifold 32 that leads to a discharge nozzle or plate 34 positioned to dispense into a single serving chamber 22 or all pod chambers or sachets. This arrangement can be suitable for large-scale industrial filling operations, or scaled-down to countertop size for use in homes, businesses, hospitals, doctors' offices and pharmacies. (A countertop filling machine would undergo the same general steps outlined above.) The pod 20 is placed on a turntable (not shown) that is controlled by a motor or other type of controllable driver to sequentially position the nozzle 34 above each serving chamber 22. Each hopper is configured to deliver a metered dose of formula or material, preferably (but not necessarily) in beadlet, liquid, oil, powder, granule or pill/tablet form, through suitable motor M controlled valves. Each motor M controlled valve is thus cycled or controlled so as to deliver the desired amount of each ingredient into a given serving chamber 22 so as to accomplish the desired formulation per the dashboard order (FIG. 5). After each serving chamber 22 is filled per specification, the pod 20 is indexed (on its turntable) to the next serving chamber 22 which is then custom-filled. And so forth until the entire pod 20 is filled as per the dashboard order. For this process, and the other processes as described herein, the pod may pass through a metal detector after the filling process is completed, or at any point during the filling process, e.g. between filling of ingredients or between filling of serving chambers.

Figure 8:
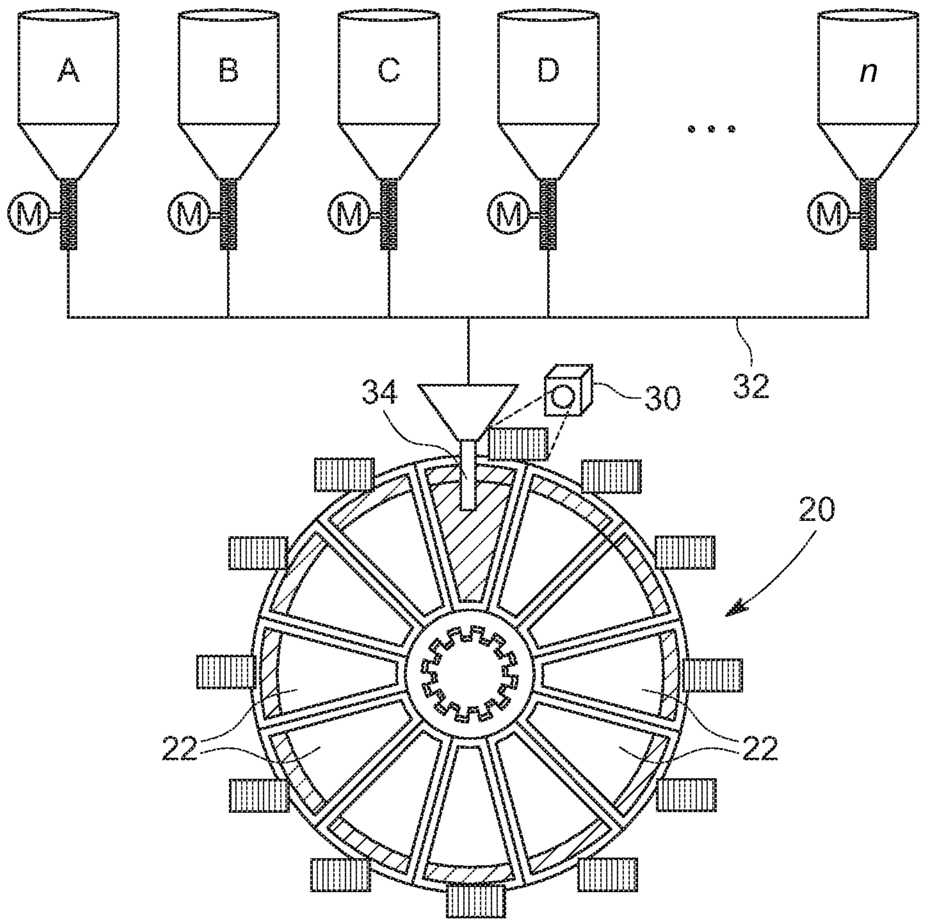
FIG. 8 illustrates a schematic of a filling process using hoppers according to another example.

FIG. 8 is similar to FIG. 7, but instead of motor controlled valves, each hopper is fitted with a variable screw-type delivery system controlled by a stepper motor M or other suitable driver. A screw-type delivery system controls the amount of discharged ingredient by controlling the rotation or feed rate of a screw. Again, in this example, all hoppers feed into a common manifold 32 that leads to a discharge nozzle 34 that is positioned to fill into one serving chamber 22 or sachet at a time. This arrangement is likewise suitable for large-scale industrial filling operations and scaled-down countertop size for use in doctors' offices and pharmacies and the like.

In FIG. 7, each hopper may be fitted with an open-and-closing gate or plate delivery system controlled by a motor M or other suitable driver, instead of a motor controlled valve. An open-and-closing gate or plate delivery system controls the amount of discharged ingredient by controlling the volumetric amount to feed into pod or sachet via rotation, horizontal motion or vertical motion to open and close the gate or plate. In this example, a hopper feeds into a common manifold 32 that is positioned to fill into a plate that feeds into a single chamber or multiple chambers 22, or a single sachet or multiple chambers at a time. This arrangement is likewise suitable for large-scale industrial filling operations and scaled-down countertop size for use in doctors' offices, pharmacies, and the like.

FIG. 7 illustrates a square or circular turntable on which rotates multiple pods, represented here by the barcode unique identifier on the pod cartridge 20 or sachet fixture. The scanner or sensor 30 scans the unique identifier on the pod or sachet. The hopper 34 is shown over one pod cartridge 20, and multiple hoppers may be aligned in series to be located over each of the pod cartridge 20 locations to position and fill formula. The hopper 34 may be fitted with an open-and-closing gate delivery system, screw-type delivery system, or the like. This arrangement is likewise suitable for large-scale industrial filling operations as well as scaled-down countertop size for use in doctors' offices and pharmacies and the like.

FIGS. 9A-9F illustrate an alternative progressive-filling arrangement where hoppers containing ingredient parts (exemplified here as A-F) are arranged in a circle around or the tubing/piping around the pod 20 to be filled. That is, in this simple example, the user has designed the pod 20 to contain some combination of but not limited to five (5) ingredients (A-F) among the serving chambers 22. The amount of each ingredient (A-F) may vary from one serving chamber 22 to the next depending on the user's dashboard selections (FIG. 5) or each chamber is filled exactly the same with same amounts of A-F.

Figure 9A:
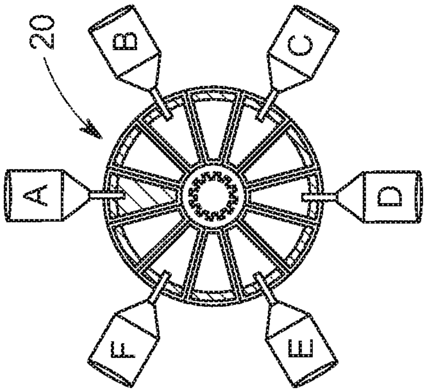
FIGS. 9A-F illustrate a progressive-filling arrangement and process according to an example.

The pod 20 is supported on a turntable (not shown) that is control led by a stepper motor or other type of controllable driver to sequentially index the pod 20 according to the number of its serving chambers 22. For example, a pod 20 having twelve (12) serving chambers 22 must be indexed in 30° increments. Each hopper has a feed nozzle 34 leading into a different serving chamber 22. The serving chamber 22 that appears at the 12 o'clock position in FIG. 9A is darkened to facilitate explanation of the indexing sequence that follows through FIG. 9F. This darkened serving chamber 22 is referred to a Serving Chamber #1 for this example only.

In FIG. 9A, all of the hoppers (A-F) are controlled to discharge the predetermined amount of their ingredients into the restive underlying serving chambers 22. Thus, in this example, hopper A dispenses its ingredient, in the pre-specified amount, into Serving Chamber #1. The serving chambers in the 2 o'clock, 4 o'clock, 6 o'clock, 8 o'clock and 10 o'clock positions also receive corresponding charges of ingredients from their respective hoppers B-F.

Figure 9B:
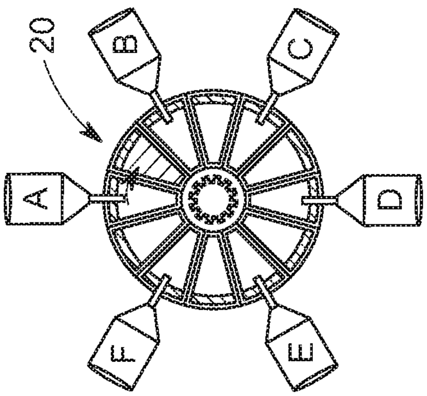

FIG. 9B shows the pod 20 indexed so that Serving Chamber #1 is in the 1 o'clock position and out of alignment with all of the hoppers. The serving chambers 22 now in the 12 o'clock, 2 o'clock, 4 o'clock, 6 o'clock, 5 o'clock and 10 o'clock positions receive corresponding charges of ingredients from their respective hoppers A-F. The amount of ingredients dispensed from each hopper in this second round may be different from the amounts dispensed in first round (FIG. 9A).

Figure 9C:
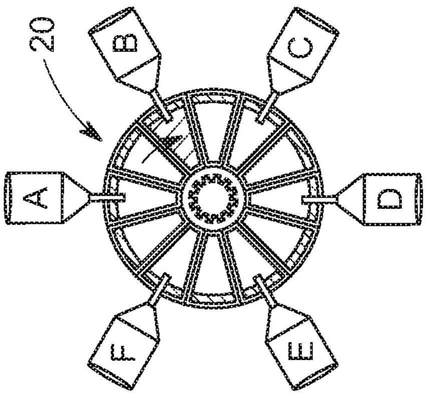
Figure 9D:
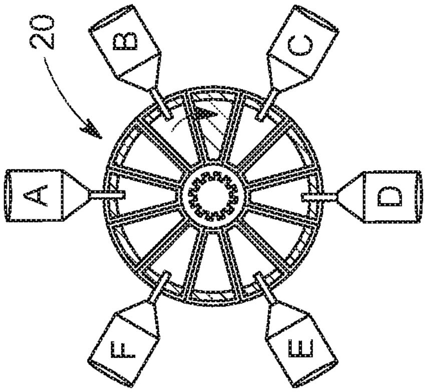
Figure 9E:
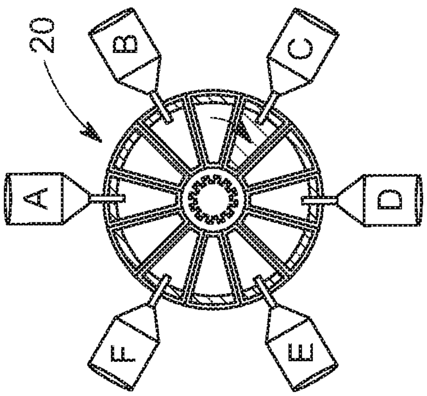
Figure 9F:
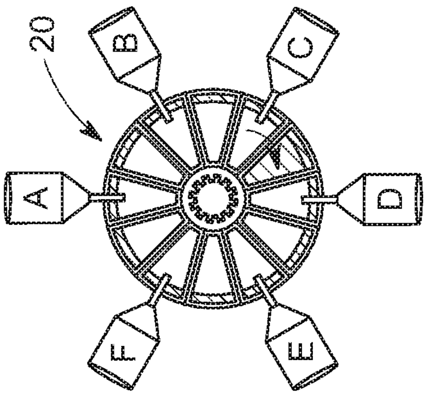

Once the ingredients have been fully dispensed in round two, the pod 20 indexes to the next sequential position which is shown in FIG. 9C. Serving Chamber 1 is now in the 2 o'clock position aligned with the hopper for ingredient B. The serving chambers 22 now in the 12 o'clock, 2 o'clock, 4 o'clock, 6 o'clock, 8 o'clock and 10 o'clock positions receive corresponding charges of ingredients from their respective hoppers A-F. The amount of ingredients dispensed from each hopper in this third round may be different from the amounts dispensed in either of the first and second rounds (FIGS. 9A and 9B). Once the ingredients have been fully dispensed in round three, the pod 20 indexes to the next sequential position which is shown in FIG. 9D with Serving Chamber #1 in the 3 o'clock. Round four. FIGS. 9E and 9F illustrate continued indexing for rounds five and six, respectively. Six further rounds (not shown) are required to complete a full circle so that every serving chamber 22 receives a specified charge of ingredient from each hopper. (Of course, the number of rounds will typically correspond to the number of serving chambers 22.)

Figure 10:
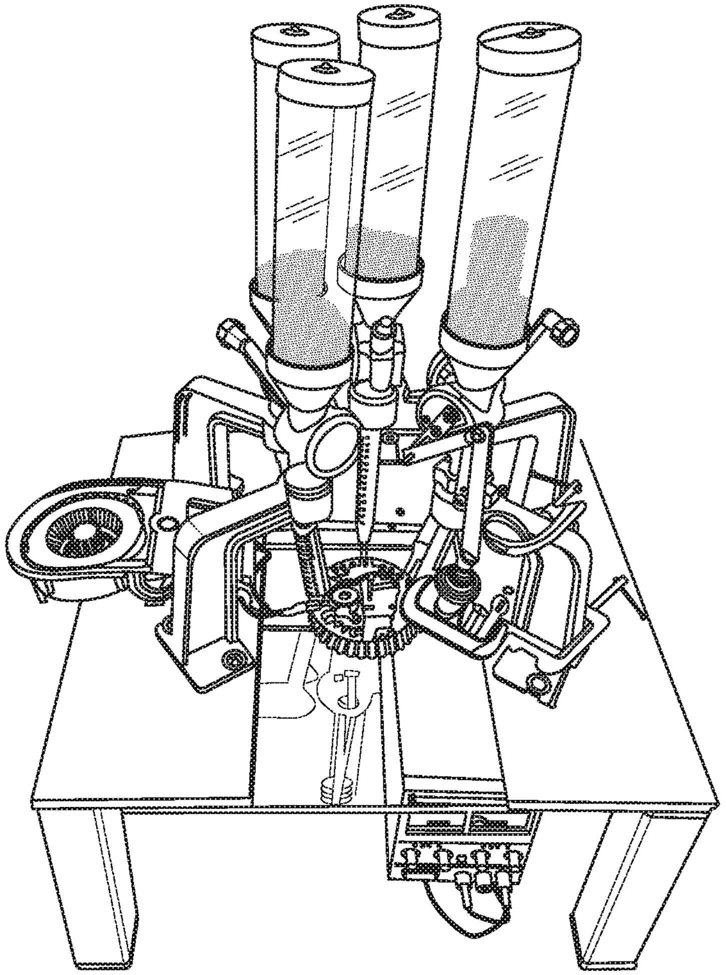
FIG. 10 illustrates a system for a progressive filling arrangement according to an example, and for use with the process of FIG. 9.

The progressive-filling arrangement which has been illustrated and described in a highly simplified manner in FIGS. 9A-F is well-suited to large-scale, high-speed automation filling operations. The preceding descriptions refer to the pod 20 rotating while the hoppers remain stationary. All motion is relative, and therefore it will be understood that the hoppers A-F could, in fact, be mounted on a revolving platter or on robotic arms and moved around a stationary pod 20. FIG. 10 is a photograph showing a prototype progressive-filling arrangement operating under the principles described above.

Figure 11:
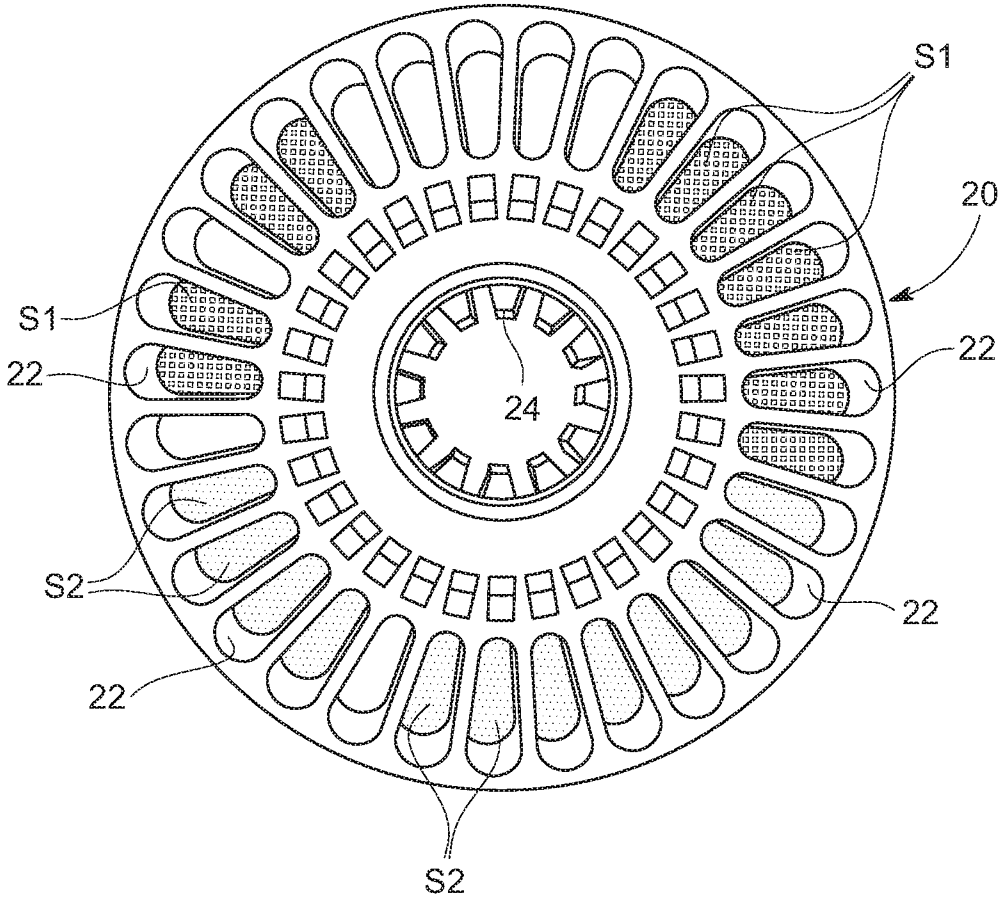
FIG. 11 illustrates a perspective view of an unsealed pod that is at least partially filled according to an example.
Figure 12:
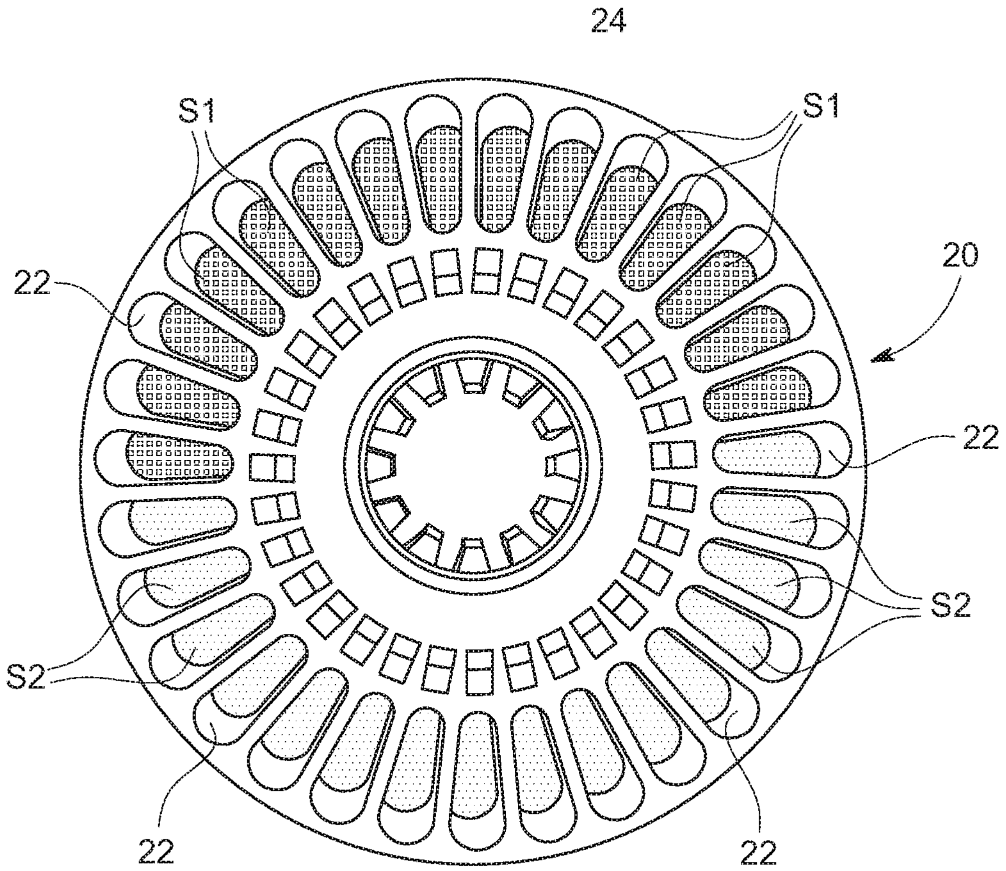
FIG. 12 illustrates a perspective view of an unsealed pod that is at least partially filled according to another example.

Turning now to FIGS. 11 and 12, views of a filled (or partially-filled) pod 20 are shown without a foil membrane seal 26. In some situations, it may be desirable to segregate certain components within the compounded formulas S that may be ill-suited for long-term comingled storage but that nevertheless are intended for concurrent consumption in a single dose. For one example, if a dose is composed of Part S1 ingredients and Part S2 ingredients, however Part S2 ingredients will be adversely affected in dose proximity to Part S1. When stored together, then Part S1 ingredients can be contained in separate serving chambers 22 from the Part. S2 ingredients.

FIGS. 11-12 illustrate this principle by identifying one ingredient S1 that must be segregated from the other ingredient(s) S2 prior to use. At the time of dispensing, a serving chamber 22 containing S1 ingredient will be first evacuated into a mixing cup (not shown), and immediately thereafter the S2 ingredient is evacuated into the same mixing sup so that all parts S1/S2 are consumed in the same dose. Of course, the order could be reversed with the Part S2 first evacuated. FIG. 11 also shows varying amounts of S1 and S2 ingredients contained in respective serving chambers 22.

Figure 13A:
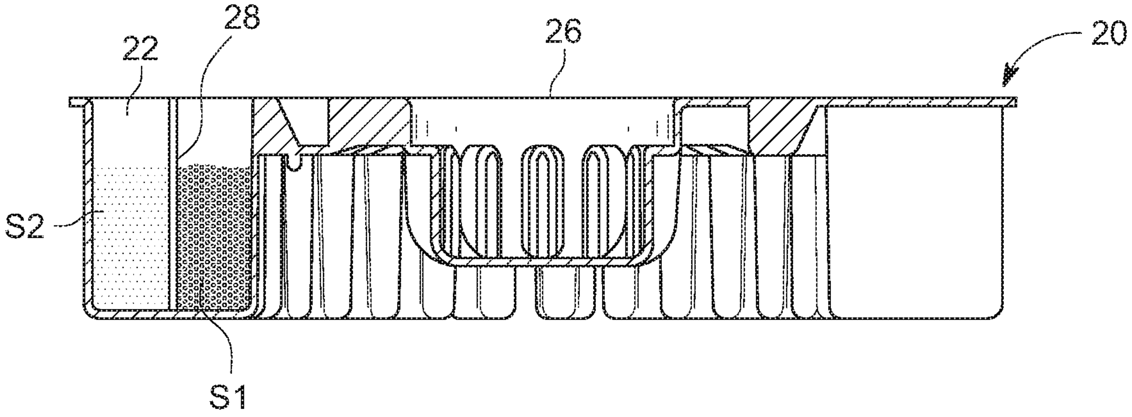
FIGS. 13A and 13B illustrate a pod with a partitioned serving chamber according to an example.
Figure 13B:
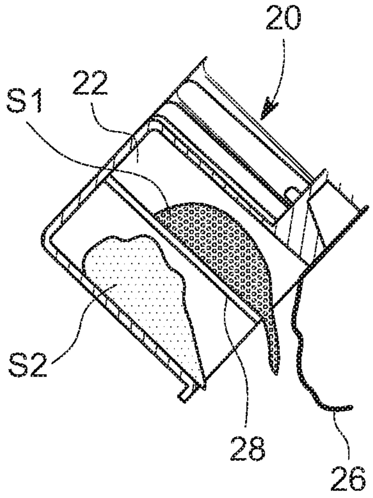

Alternatively, the serving chamber 22 can itself be segregated with a partition 28, as shown in FIGS. 13A and 13B, or multiple partitions 28. The partition(s) 28 can be used to maintain physical separation between the Part S1 and Part S2 ingredients (continuing the previous example). As illustrated in these highly simplified figures, Parts S1 and S2 are maintained separate until the foil membrane 26 (or lid, etc.) is opened, at which time Parts S1 and S2 are simultaneously evacuated (FIG. 13B).

Figure 14:
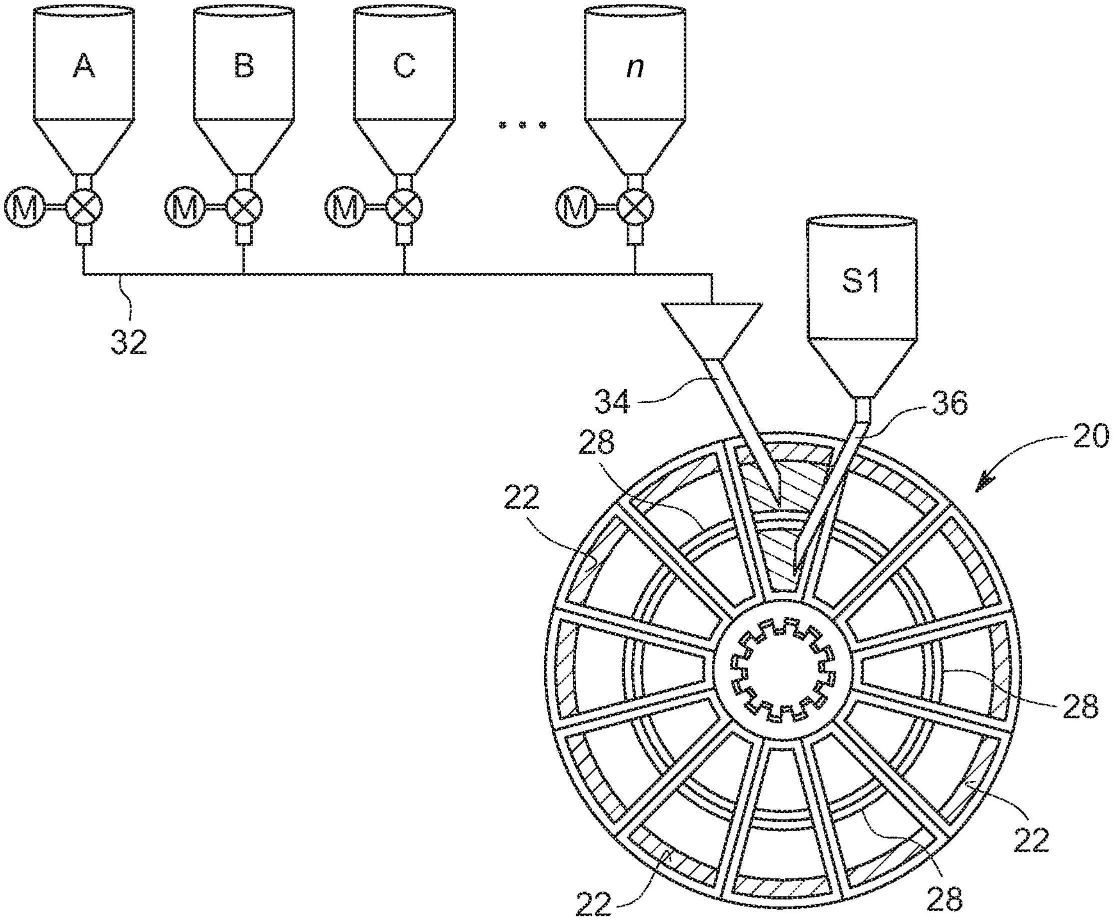
FIG. 14 illustrates a schematic of a filling process for a pod with partitioned serving chambers according to an example.

FIG. 14 shows an exemplary pod 20 configured with partitions 28, and set on an indexable turntable (not shown) within a manifold style filling system like that of FIGS. 7 and 8 in this case, a dedicated hopper is provided for the S1 component which is intended to remain segregated from the A-n ingredients until the dose is administered. The common nozzle 36 leading from the manifold 32 sequentially feeds to the outermost bay of each serving chamber 22. The hopper for the S1 ingredient includes a nozzle 36 that is positioned to feed the inner-most bay of each serving chamber 22.

Figure 15:
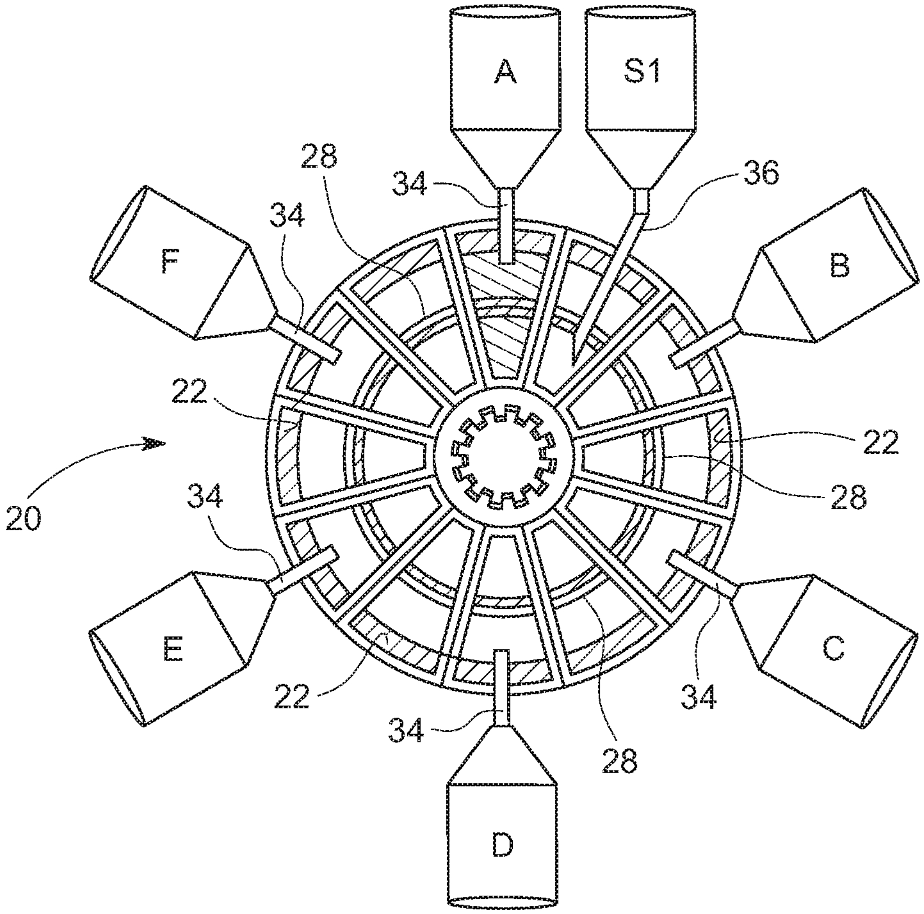
FIG. 15 illustrates a schematic of a filling process for a pod with partitioned serving chambers according to another example.
Figure 16:
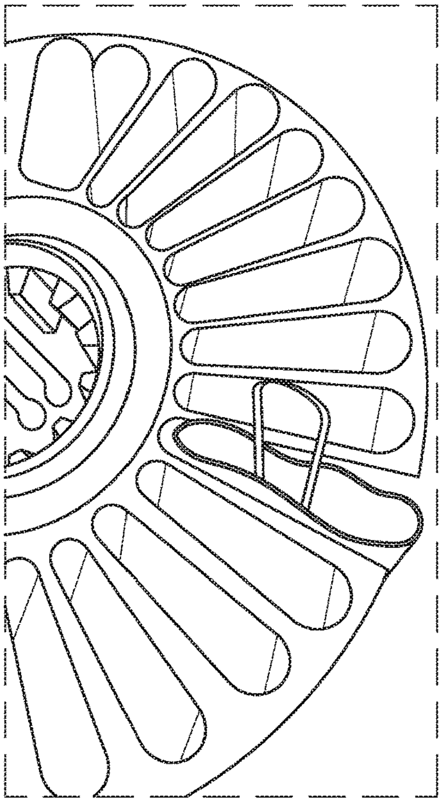
FIG. 16-19 illustrate various views of a pod for filling one or more sachets according to an example.
Figure 17:
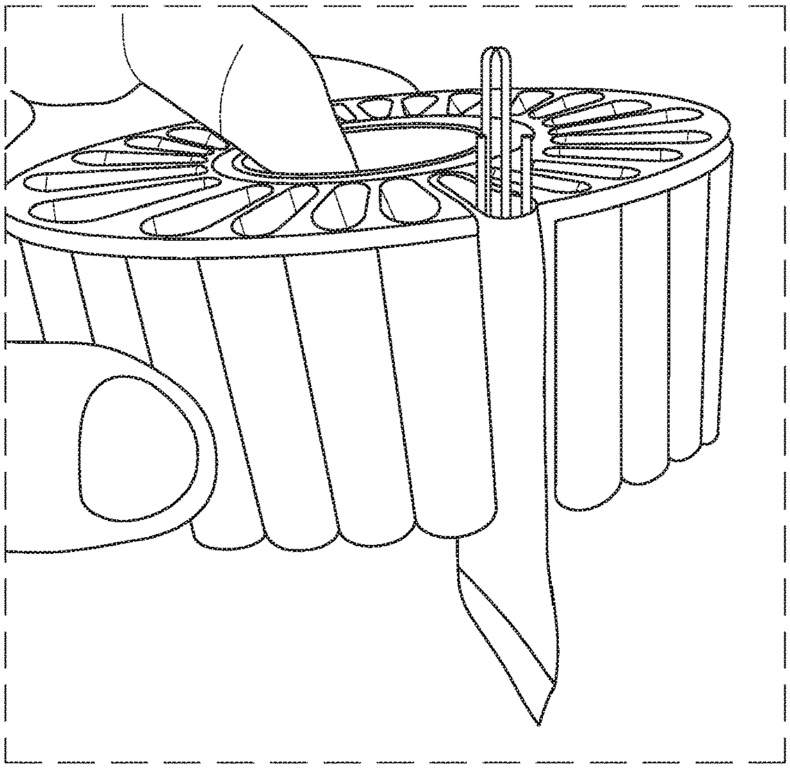
Figure 18:
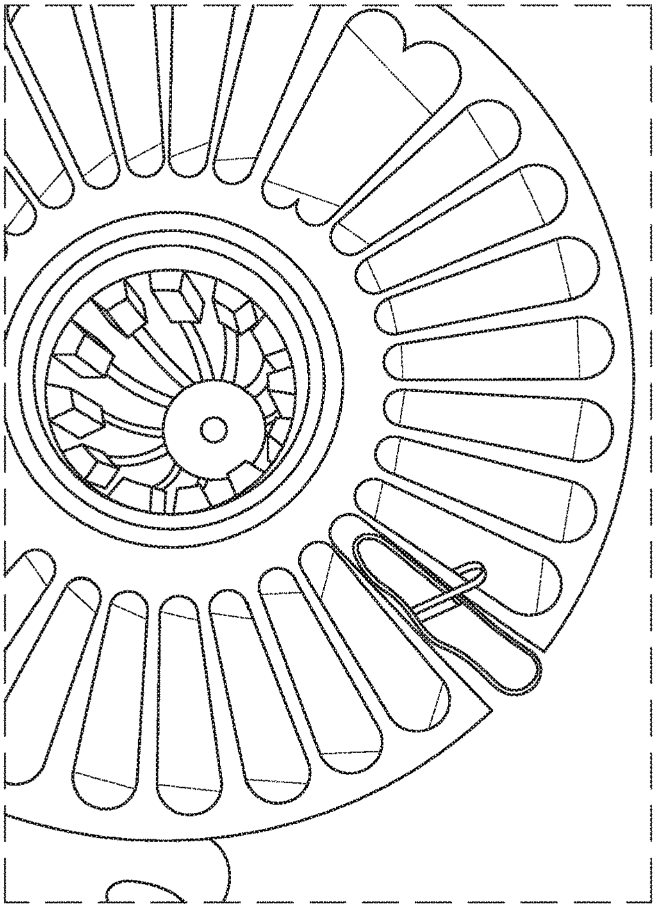
Figure 19:
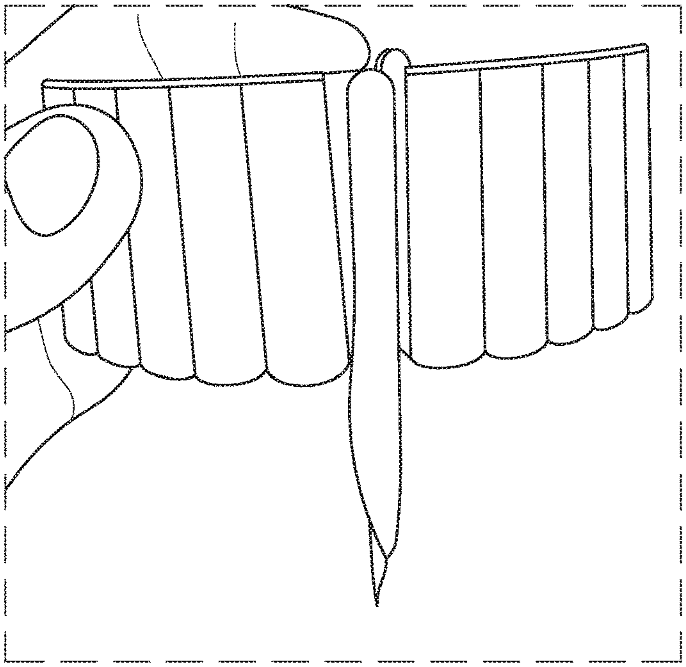

FIG. 15 shows an exemplary pod 20 configured with partitions 28 as in FIG. 14, but in this case is set on an indexable turntable (not shown) within the breach of a progressive-filling system like that of FIGS. 9A-F. The nozzle 36 for a dedicated hopper containing the S1 ingredient is positioned to sequentially feed the inner-most bay of each serving chamber 22. The respective nozzles 34 for the hoppers A-F sequentially feed the outermost bays of the serving chambers 22. By reference to the preceding descriptions, it will be understood that a pod 20 fitted with partitions 28 can be easily filled according to any of the aforementioned methods.

In various examples, the pod 20 filling processes and systems according to the present disclosure may be incorporated into hooded enclosure systems that can be temperature, humidity and/or oxygen controlled. One or both of these workflow systems may utilize a 3-axis track system of hoppers that segregate individual ingredients, or blends of ingredients, to then be individually dosed based on assigned weights.

In summary, the formula S may be composed of combinations of ingredients A-n. Although preferably these elements are in beadlet form, the principles of this invention will apply also to various granulated size ingredients, powders, liquids, oils, gel tablets and even pills. The formulas S formula is held inside individual serving cells 22 in a multi-cell container or pod 20. Each pod 20 has individual serving cells 22 that can be filled with a combination of these ingredients A-n to create individualized/customized formula formulas S in individual cells 22 in each pod 20. These combinations of ingredients can be ingested in many ways, they can be added to various liquids and smoothies, consumed stand alone or on top of other foods.

Used pods 20 can be separated from other materials and all recyclable plastics can be recycled or reused for other uses.

The pods 20 may have various configurations. In one example, the pod is formed as is shown and described above with reference to FIG. 2 with a frame or structure forming a series of serving chambers, e.g. from a plastic material or the like.

In another example, the pod may be formed with a circular or annular shape to hold or otherwise support one or more sachets for filling. A sachet may be provided as a flexible pouch or packet. In one example, the sachet is be a stand-alone object, similar to a single serve sugar packet. In other examples, the sachet may be provided as described above. The pod may be provided as a frame or other support structure to support a series of sachets for filling, or for filling and later use. The pod supports the sachet(s) such that they may be opened, filled, and then sealed prior to removal from the pod.

Figure 20:
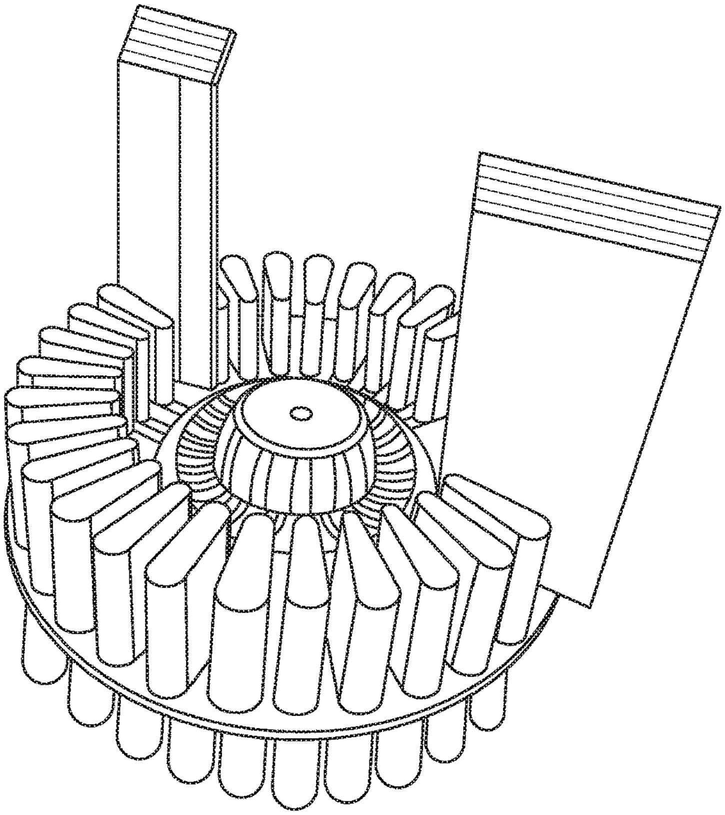
FIGS. 20-22 illustrate various views of a pod for filling one or more sachets according to another example.
Figure 21:
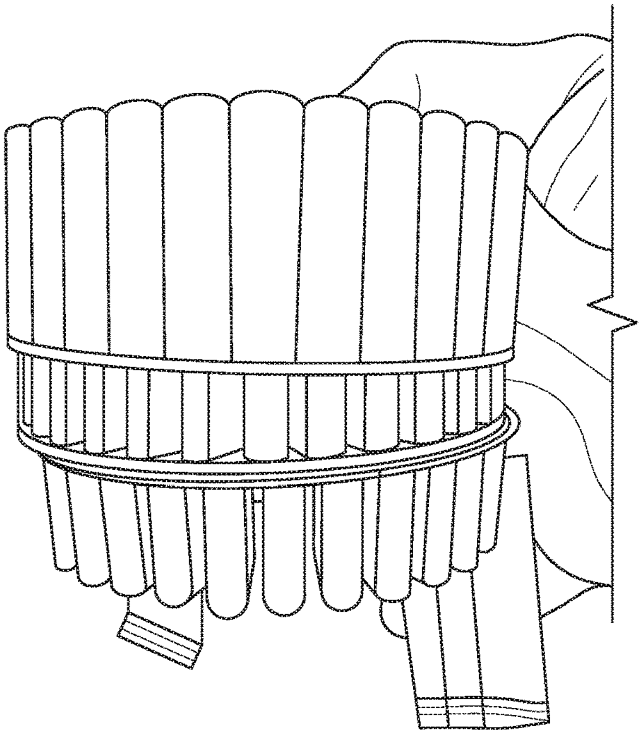
Figure 22:
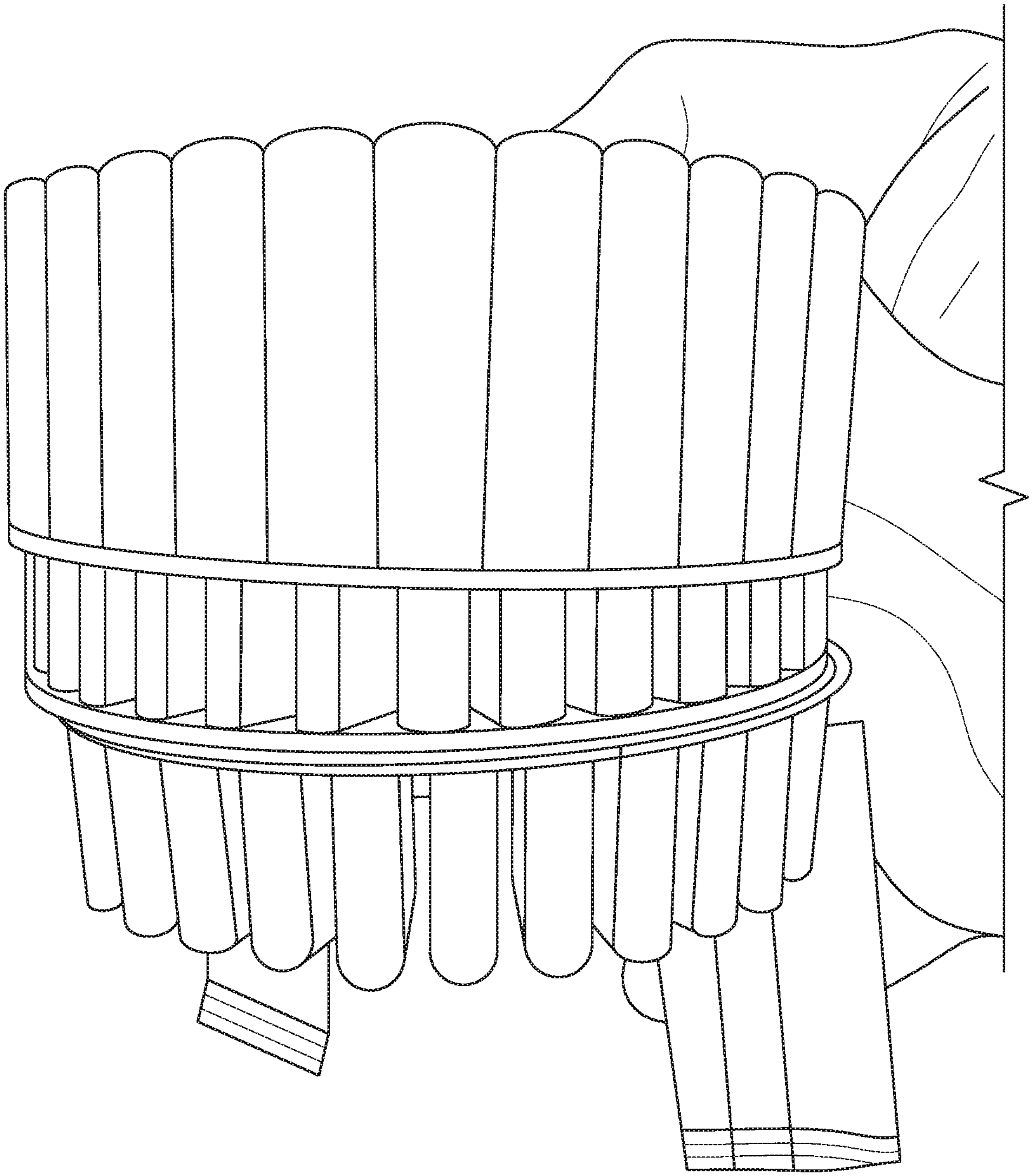

FIGS. 16-19 illustrate an example of a single sachet in a modified pod structure for filling. In a further example, a series of sachets may be provided and arranged in a circular or annular manner about the pod. The sachets may be supported by the pod in various manners. In one example, the sachet is temporarily connected to the pod structure via a fastener or the like, that is then removed during or after a sealing step. In another example, the pod may have a floor or other underlying support structure for the lower end of the sachet. In another example, as shown in FIGS. 20-22, a funnel fixture is provided that matches the same number of cavities of the pod filled, this fixture holds one or a series of empty sachets in circular series (show in upper pod in FIG. 20 in green), and the green pod has openings similar to a funnel to allow formula to flow into each respective sachet. This fixture then can be laid over another pod (shown in FIG. 21) that is filled and that lays and sits into said pod. The pod plus the fixture with sachets can be rotated (similar to that described below with respect to FIGS. 32-33) to allow formula to flow into sachets. FIGS. 20-22 illustrates steps 1, 2, and 3 sequentially for filling sachets.

In another example, powder will flow through individual funnels lined up to the fill equipment where powder will flow to the individual sachets as it aligns under the hopper as shown in FIG. 7.

For multiple sachets on a pod, the sachets may be filled similarly to that described herein for the serving chambers of the pod and with various formulas S. The open end of the sachet may then be sealed or otherwise closed after the filling process is complete. The sachets may be then removed from the pod for distribution or use as single serve packets.

According to various embodiments, a filling process and apparatus for filling a multi-serving chamber or multi-cavity container, such as a pod, or a pod with sachets is provided. The chambers of the pod may be filled using a volumetric filling process such that a formula S evenly fills each cavity or chamber at the same time, or alternatively, the chambers of the pod may be filled by various formulas.

FIGS. 23-26 illustrate a filling process and apparatus according to an embodiment and that employs a gate style mechanism, A plate is provided that contains a series of volumetric cavities. The volumetric cavities may be provided as apertures that extend through the plate. The cavities may be positioned and spaced for alignment with serving chambers of a pod. One or more sliding bases or gates are provided to cover the lower side of the plate. The sliding bases act as a floor for the volumetric cavities, and are movably supported relative to the plate.

In one example, and as shown in FIGS. 23-26, a filling process an apparatus with a gate style mechanism and a single gate that linearly translates or slides relative to the plate is shown in other examples, a single gate may rotationally translate or slide, or otherwise move in rotation relative to the plate. In further examples, multiple gates may be provided and move relative to the plate. For example, two or more gates may slide in translation and/or rotation relative to the plate during the filling process, and the gates may be moved in different directions relative to one another in a further example, the gate mechanism may have as many as one gate for each of the intended serving chambers, and may be moved radially relative to one another, e.g. radially outward from a center axis of the pod. The motion and position of the gate(s) may be controlled by one or more servos or motors. The servos or actuators or motors may be in communication with a control system having a controller or a computer or PLC (programmable logic controller) for an automated filling process.

The gate may lie and move within a horizontal plane, and slide or translate along a single axis. The gate may lie and move within a horizontal plane, and rotationally translate about a single axis while remaining in the horizontal plane.

The gate may be provided with various shapes. In one example, and as shown, the gate has an outer perimeter that is substantially D-shaped, and an inner perimeter that is circular. In other examples, the plate may be another shape and/or size.

The gate mechanism and the pod are brought into alignment with one another, e.g. on an assembly line process. The plate and the pod are positioned such that the volumetric cavities and the serving chambers are aligned or overlapping with one another while the gate remains in a closed position covering the cavities and acting as a floor for the plate.

Figure 23:
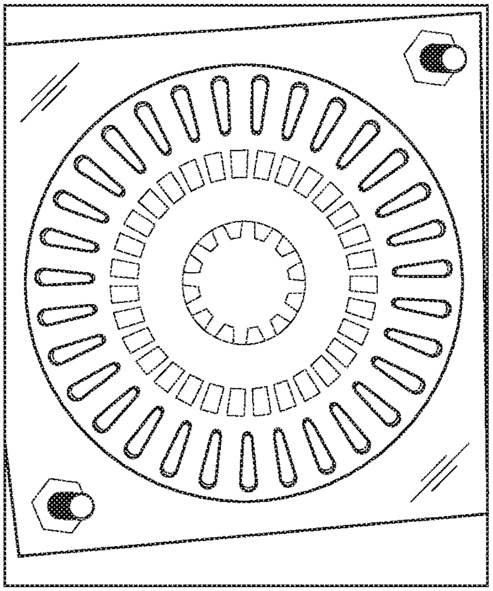
FIGS. 23-26 illustrate a filling process and apparatus employing one or more sliding gates according to the present disclosure.
Figure 24:
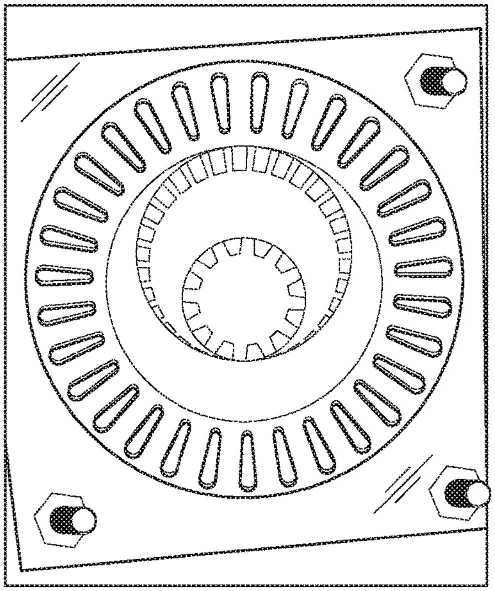

FIG. 23 illustrates a filled gate mechanism with the gate in a closed position. With the gate(s) in a dosed position, e.g. covering and acting as a floor for the cavities in the plate, a formula S has been placed into each cavity of the plate. The formula S may be the same in each cavity in the plate, or may differ between cavities. Alternatively, any number of the cavities may be filled or otherwise provided with formula S, and as few as one cavity may be provided with formula S. The cavities in the plate may be filled as described above for a pod. The formula S may be provided in various forms as described herein, and includes pills, liquid, powders, gels, candy, gummies, foods, beadlets, solid food, liquid food, food powders, food solids, oils, granules, and the like. When the formula plate is intended for use with pills or capsules, the cavities in the plate may be sized to correspond with the intended pill or capsule to appropriately meter the filling of the pod and provide the correct dosage. When at least one of the cavities is filled to a set or predetermined level, the process may proceed to the next step as illustrated in FIG. 24. The level within one cavity may be determined using a sensor, such as an optical sensor, or may be provided by the filling equipment.

FIG. 24 illustrates the gate mechanism with the gate in a first, partially open position, with some of the cavities unobstructed by the gate such that the formula in these cavities is dropping into the associated chambers of the pod. For other examples with multiple slide gates, the gates may be opened simultaneously, or may be opened in a sequential manner to allow the formula to drop into the pod.

Figure 25:
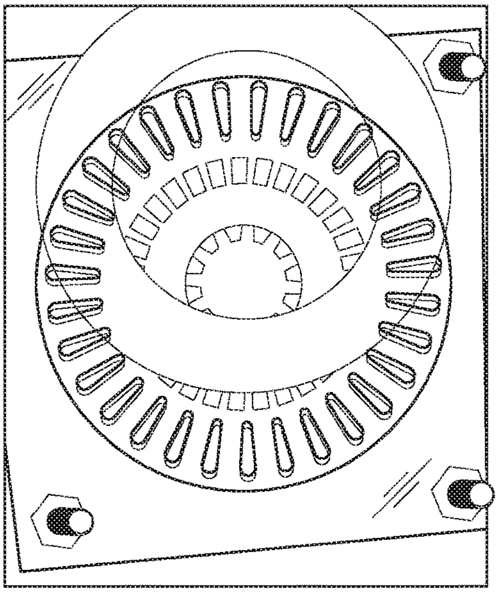

FIG. 25 illustrates the gate mechanism with the gate in a second, partially open position, with more of the cavities unobstructed by the gate in comparison to FIG. 24.

Figure 26:
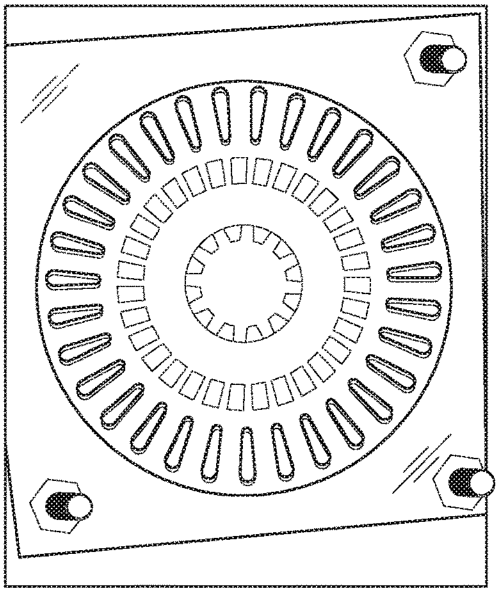

FIG. 26 illustrates the gate mechanism with the gate in a fully open position, such that all of the formula has exited the cavities and is within the underlying pod. At this point the filling process for the pod is complete, the pod may be moved relative to the gate mechanism for sealing or another closure process, and an empty pod may be brought in for the next filling cycle.

Figure 27:
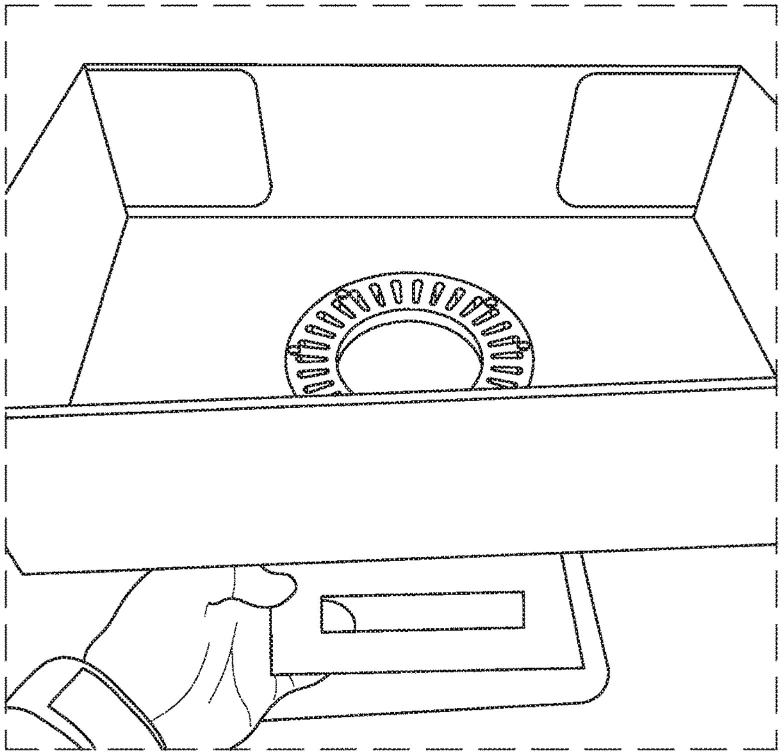
FIGS. 27-31 illustrate a vibrating and gate apparatus and filling process according to the present disclosure.
Figure 28:
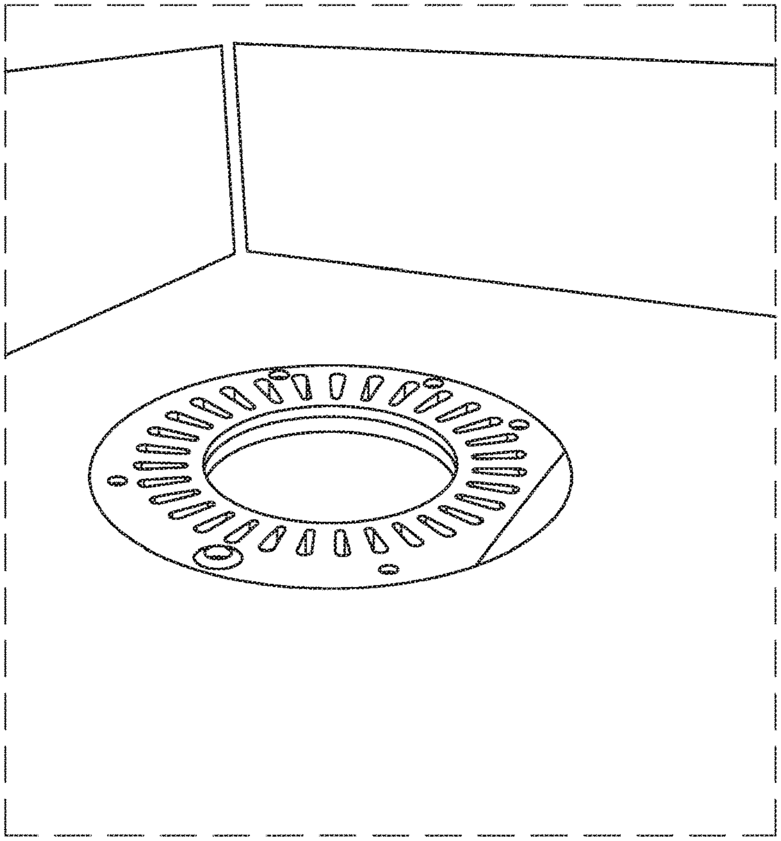
Figure 29:
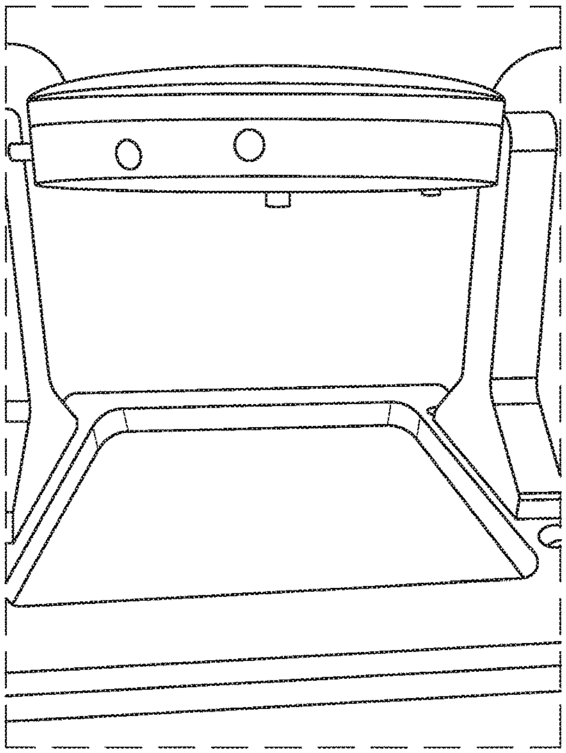
Figure 30:
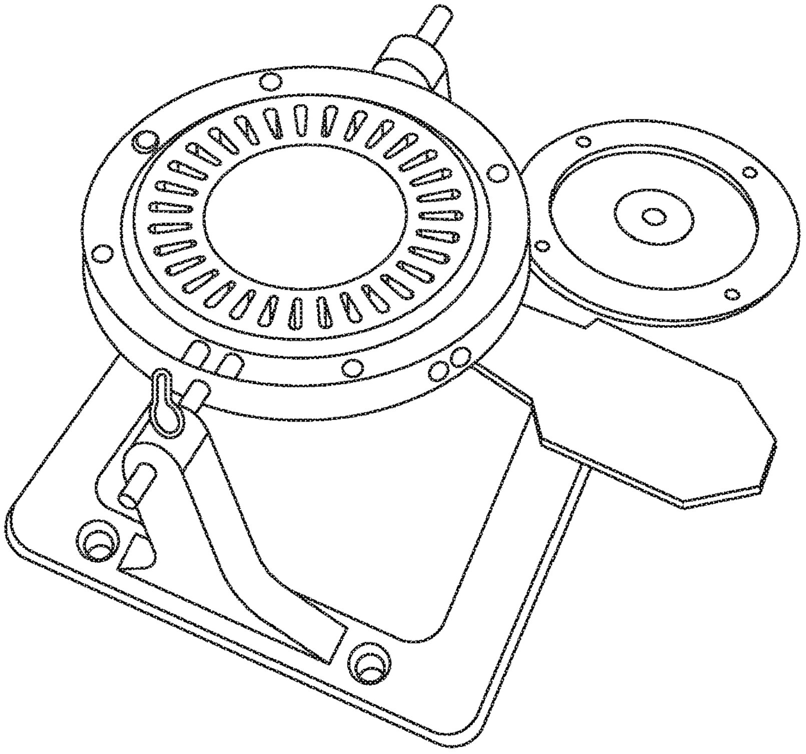
Figure 31:
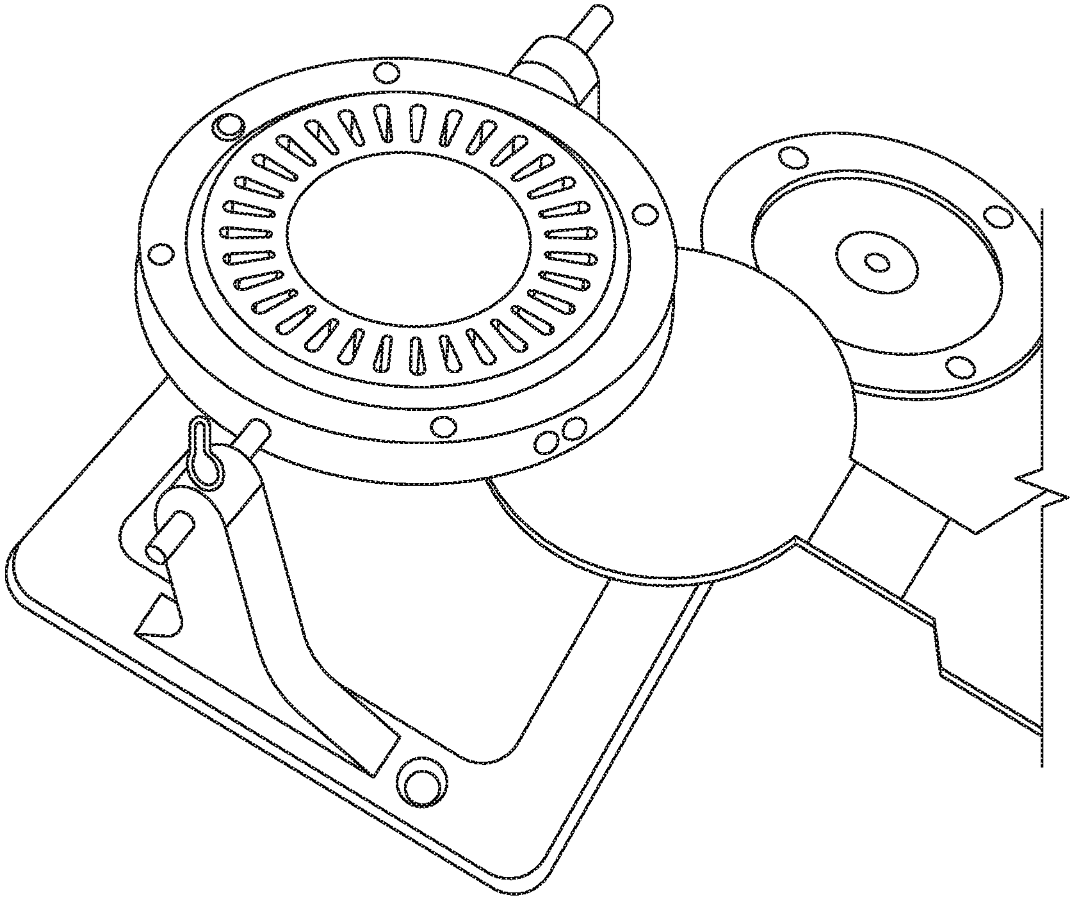

FIGS. 27-31 illustrate a vibrating and gate mechanism apparatus and filling process according to an example. FIG. 27 is a perspective view of a mockup of the apparatus, FIG. 28 is a perspective view of a filling plate in the hopper, and FIG. 29 is a perspective view of beneath the filling plate and hopper where a pod for filling is to be positioned. FIGS. 30-31 illustrate the filling plate and stand, and associated gate without the associated hopper according to an example.

As shown in FIG. 27, a filling plate or element has a series of volumetric cavities. The volumetric cavities may be provided as apertures that extend through the plate. The cavities may be positioned and spaced for alignment with serving chambers of a pod. One or more sliding bases or gates are provided to cover the lower side of the plate, as is shown in FIGS. 30-31. The sliding bases act as a floor for the volumetric cavities, and are movably supported relative to the plate.

Referring back to FIGS. 27-28, a hopper surrounds or is otherwise adjacent to and feeds the filling plate. The upper surface of the filling plate may be flush with or offset below the base plate of the hopper. The hopper and/or the filling plate may be connected to a vibration module or a similar system to create agitation in the formula positioned within the hopper and direct the formula towards and into the volumetric cavities. The formula in the hopper may be provided according to the various examples as described above. The hopper may be a single hopper and in communication with multiple volumetric cavities in the filling plate according to one example and as shown. In another example, there may be multiple hoppers associated with the filling plate, with channels from each hopper to one or more associated volumetric cavities in the filling plate. The hopper(s) may contain a sensor providing an indication of the weight of the formula to provide an indication of the amount of formula being provided to the pod for precision and accuracy, and also to regulate or control the agitation or vibration to control the flow of formula going into the pod during the filling process.

As shown in FIG. 29, a stand supports the filling plate and provides a region underneath the filling plate and hopper to position and align a pod for filling with the filling plate during a filling cycle. In one example, a conveyor system for pods may be positioned to extend through the stand and region under the filling plate.

FIG. 30 illustrates a gate for the filling apparatus in a closed position for filling the filling plate cavities, and FIG. 31 illustrates the gate in an open position for filling the pod from the filling plate. The gate may be operated and have various shapes, sizes, and motion as described above with respect to FIGS. 23-26.

In a further application of the example shown in FIGS. 27-31, one or more hoppers may be provided with a channel that directs formula into the filling plate or directly into the pod. The channel may be provided by a tithe, a funnel, an auger, a ramp, or the like that is positioned to direct a formula such as a powder into at least one cavity of the pod. The pod and/or the hopper feed system may be supported by a rotating platform that rotates and indexes the pod relative to the channel to feed formula into the next empty pod cavity. As described above, the hopper system may be provided with a vibrational module and/or sensors to indicate a weight of the powder being led into the pod.

Figure 32:
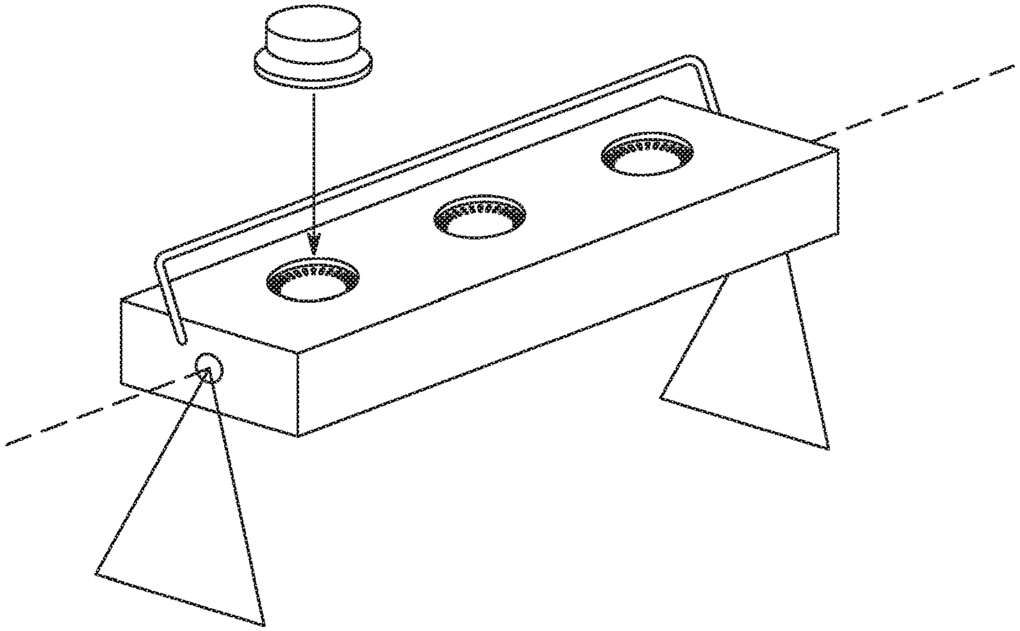
FIGS. 32-34 illustrate an apparatus and filling process according to the present disclosure.
Figure 33:
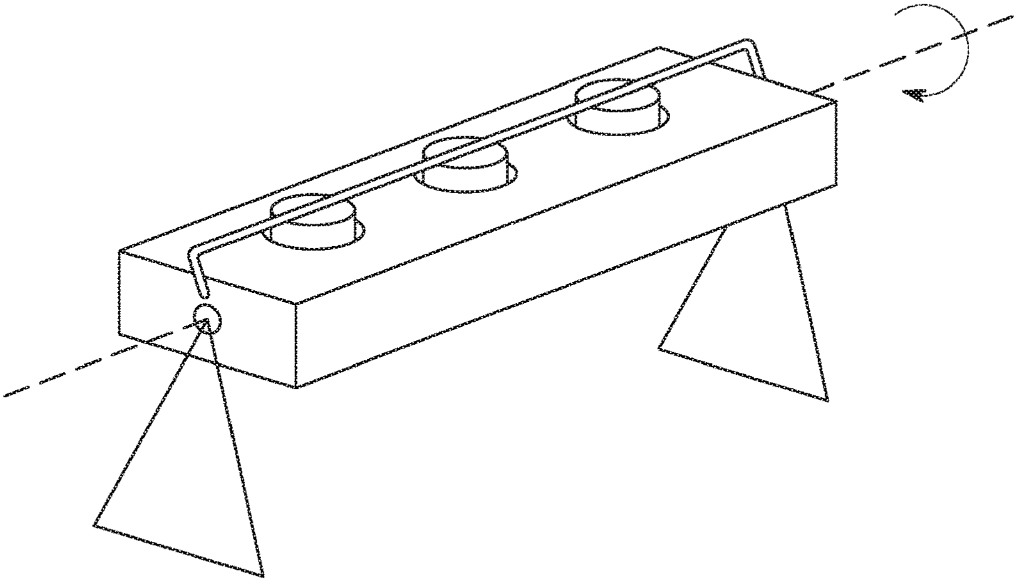
Figure 34:
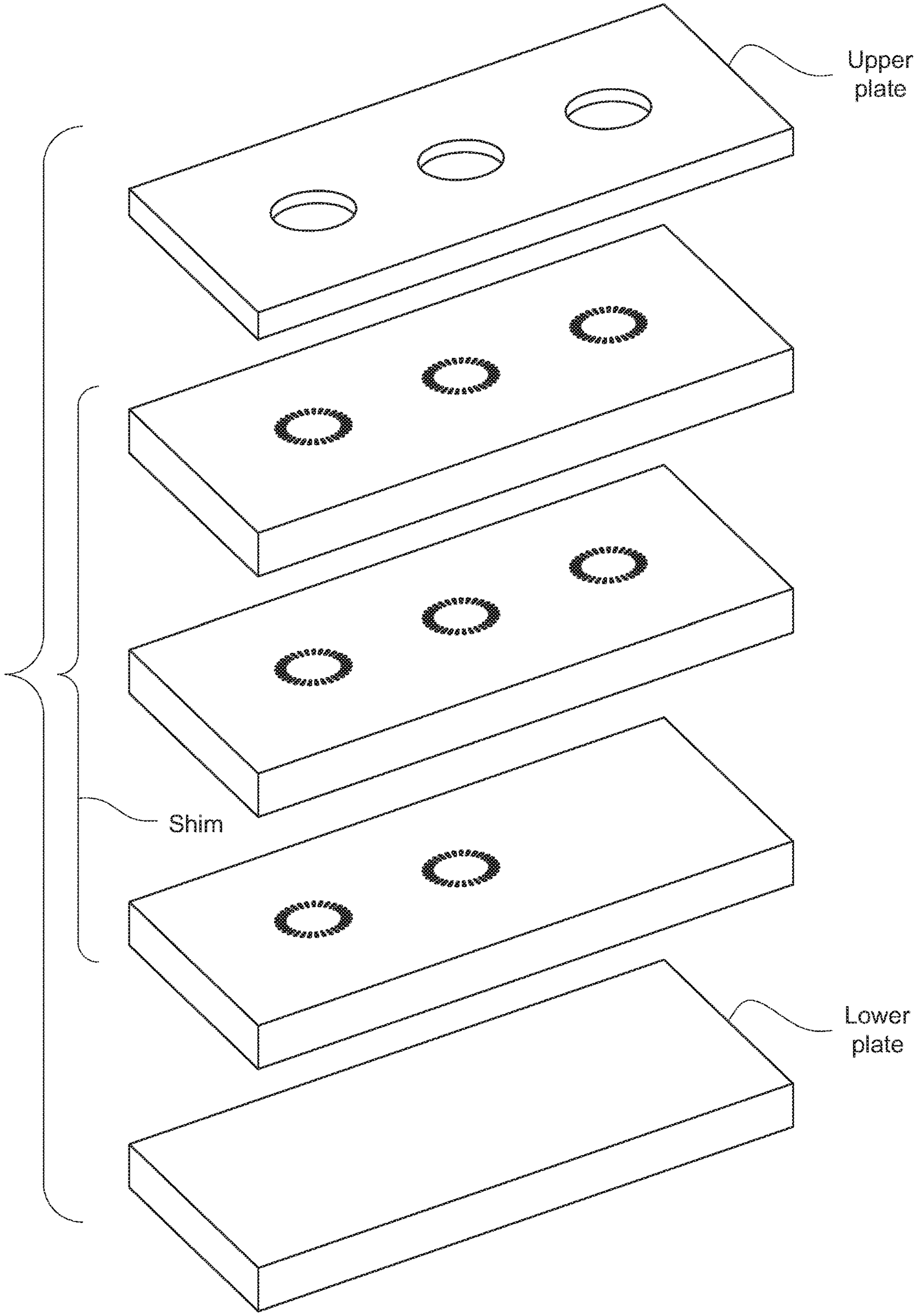

FIGS. 32-34 illustrate another filling process and apparatus according to the present disclosure. A formula plate is provided that contains a series of volumetric cavities or recesses that are positioned to align with the serving chambers of a pod. The series of volumetric cavities may intersect a planar face that is offset or recessed relative to the outer face of the formula plate such that an associated pod may be positioned to be in contact with the planar face and with the serving chambers in communication with the volumetric cavities. The formula plate may include one or more locating members to position and align the pod relative to the formula plate, e.g. a locating member may extend outwardly from the planar face.

In further examples, the formula plate may be configured to fill multiple pods simultaneously, and FIGS. 32-34 illustrate a formula plate for filling, three pods simultaneously, although any other number of pods with the formula plate is also contemplated.

The cavities of the formula plate are filled with formula according to a filling process as described above. A pod is then inserted into the formula plate with the serving chambers aligned with the volumetric cavities, e.g. the pod is inserted upside down or with the open serving chamber facing the volumetric cavities. FIG. 32 illustrates an empty pod being positioned within a formula plate that has already undergone a filling process.

A retention member may then be placed over or in contact with the pods, as shown in FIG. 33.

The formula plate is then rotated 180 degrees about a horizontal axis. The formula plate may be supported by one or more arms or a shaft that is connected to a motor to rotate the formula plate. The retention members maintain the position of the pods during the rotation process. The formula in the volumetric cavities therefore drops or falls into the associated serving chambers of the pod. The formula plate may be vibrated or otherwise moved to ensure that the formula in each volumetric cavity drops into the serving chamber. The retention members may then be moved away from the pod such that the pod is set on an underlying surface or line and may be sealed. After the pods are released from the formula plate, the formula plate may be rotated back for another filling cycle.

The volumetric cavities in the formula plates may be provided with various sizes, e.g. shapes and/or depths to provide the desired volume for a transfer of formula by weight or by volume into the pod chambers. The formula plates may additionally be designed to be reconfigurable, and have a series of shim plates, and an upper and lower plate to allow for use with different formulas for a pod. The shim plates may have identical volumetric cavities with one another, and the number of shim plates may vary to vary the volume of the volumetric cavities. Alternatively, and as shown in FIG. 34, the shim plates may have a varying number of volumetric cavities compared to one another to vary the size and or number of volumetric cavities associated with a pod. Additionally, the shim plates may have the same thickness or may be provided with varying thicknesses.

Various embodiments according to the present disclosure may be implemented in a line process, such as a process with a moving conveyor system. Empty pods are positioned on the line conveyor, and pass through a filling station that fills the pods according to one or more of the filling processes described herein. The line process may include other stations, such as a sealing station, labeling station, pod sorting station, and the like. The line process may include a continuously moving line and/or a line with one or more station stops.

According to one example, and in a filling process on a line process, pods are loaded into a rotary conveyor system and move within a fixed pod area relative to the filling station. In another example, pods may be loaded, and moved into and out of a filling station using a multi-axis robot. In a further example, the line may be provided with multiple filling stations, with different pods being directed to different filling stations to maintain a desired throughput of pods and not be limited by a filling time.

The various line processes and filling processes may be automated and controlled using a control system, controllers, and various sensors or other inputs. A code, such as a an RFID tag, a barcode, a computer chip, a QR code, or the like, may be provided on the pods prior to the pods reaching the filling stations, such that the pod is scanned during the line process, and the filling station is controlled using information from the code, as well as other inputs to the system such as a custom or other predetermined set of formula instructions, to fill a specific formula into the associated pod, or into the associated pod in a specific order. In other examples, the line processes and/or the filling processes may be semi-automated or manually conducted.

According to another example of a filling process, pods are be loaded onto a rotary line conveyer system where pods will travel within a fixed pod area relative to stationary hoppers. The conveyor or base of the system may rotate the table or pods clockwise or counter-clockwise such that the pods move along the line and/or stopping at one or more stations or hoppers to fill formula into serving chambers of the pods or into a sachet.

Figure 35:
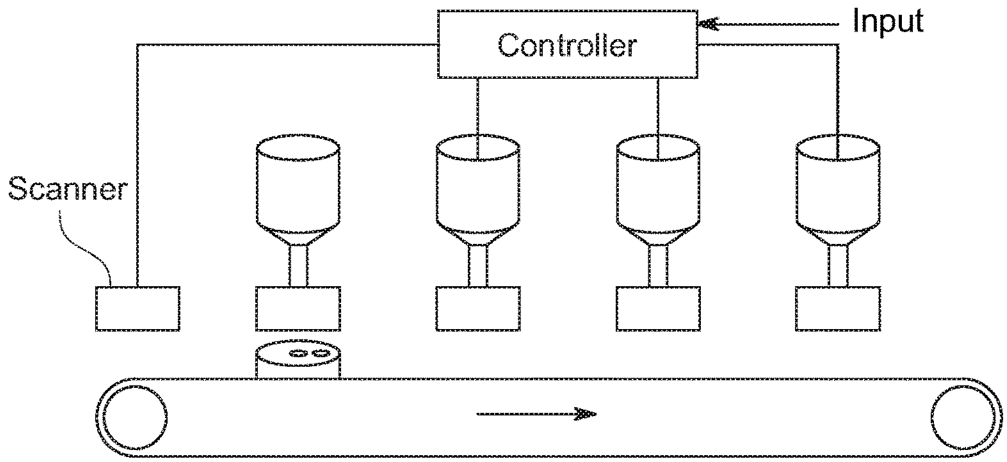
FIGS. 35-36 illustrate a system and filling process according to the present disclosure.
Figure 36:
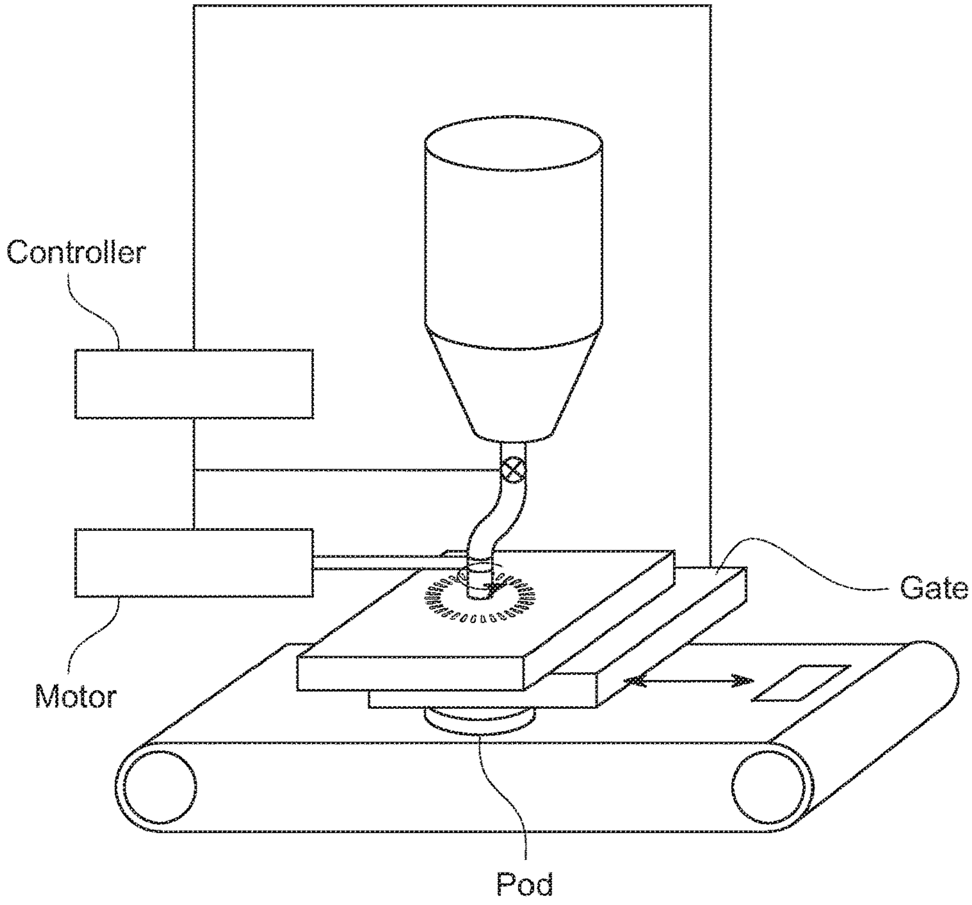

One example of a line filling process is illustrated in FIGS. 35-36. In the example shown, the pods travel along a conveyor system, which may be a rotary conveyor system or a translational, linear conveyor system as shown, or a combination thereof. The pod travels to various filling sub-stations on the conveyor system as shown in FIG. 35. One or more hopper(s) is provided at each filling sub-station. In the example shown, a single hopper containing a Part of the supplement or formula is provided at each filling sub-station. In other examples, multiple hoppers and a rotary turntable or multiple hoppers and a common manifold may be provided at each filling sub-station as described above. The filling system or filling station as shown in FIG. 35 may be provided with a scanner and a controller in order to determine the customized ingredient for each pod, and to control the filling sub-stations accordingly. The controller may additionally receive inputs directly from a user or from another remote system that provides the customized supplement or formula S for each pod. Based on the indicated formula S for a pod, the pod may be filled only at some of the filling sub-stations, as not all of the ingredients available at the filling station may be indicated for the pod.

According to one example, and at a filling substation as shown in FIG. 36, a hopper is connected to a dispensing nozzle. The dispensing nozzle is movable relative to a formula plate or an underlying pod. FIG. 36 illustrates a formula plate, similar to that described above. The dispensing nozzle follows a path to sequentially move over apertures or recesses in the formula plate, and the movement may be controlled using one or more electric motors. Alternatively, the dispensing nozzle may remain stationary and the formula plate and/or pod may rotate relative to the dispensing nozzle during the filling process via a rotary turntable or the like. When the cavities of the formula plate are filled at the sub-station with the indicated amount of the Part or ingredient, a gate or other mechanism may be opened to empty the Part or ingredient into the underlying pod.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for filling a pod comprising:

providing a pod having a housing defining a plurality of serving chambers arranged in an annular array and surrounding a drive hub;

receiving data indicative of a customized nutritional supplement for the pod to a controller of an automated filling station; and filling the customized nutritional supplement into at least one of the plurality of serving chambers of the pod via the automated filling station by controlling a plurality of hoppers of the filling station to dispense the customized supplement into the plurality of serving chambers of the pod, each hopper containing a corresponding ingredient available for the customized supplement;

wherein filling the pod further comprises aligning the plurality of serving chambers of the pod with a plurality of apertures in an upper plate of a filling fixture in the filling station;

wherein filling the pod further comprises filling the plurality of apertures in the upper plate with the nutritional supplement with a lower plate positioned beneath the upper plate; and wherein filling the pod further comprises translating a lower plate relative to the upper plate such that the nutritional supplement flows from the plurality of apertures directly into the plurality of serving chambers.

2. The method of claim 1 wherein each of the plurality of hoppers has an associated feed nozzle and are positioned in the filling station to surround the pod such that each hopper fills its associated ingredient directly into an associated serving chamber of the plurality of serving chambers with the pod being rotationally indexed relative to the plurality of hoppers.

3. The method of claim 1 wherein each of the plurality of serving chambers has a partition separating a first bay and a second bay, the partition segregating contents of the first and second bays when the pod is sealed; and wherein filling the pod further comprises filling the first bay of each of the plurality of serving chambers with a first ingredient of the supplement and filling the second bay of each of the plurality of serving chambers with a second ingredient of the supplement.

4. The method of claim 1 further comprising scanning a unique identifier on the pod prior to filling the pod, the unique identifier indicative of the customized nutritional supplement for the pod, wherein the filling station controls the plurality of hoppers based on the unique identifier.

5. The method of claim 1 further comprising moving the pod relative to a dispensing nozzle connected to at least one of the plurality of hoppers to sequentially fill the plurality of serving chambers of the pod from the dispensing nozzle.

6. The method of claim 5 wherein each hopper of the plurality of hoppers is provided at a separate filling substation; and wherein the method further comprises moving the pod between filling sub-stations.

7. The method of claim 6 wherein the pod is moved relative to the dispensing nozzle by moving the nozzle in a path over the pod to sequentially fill the plurality of serving chambers.

8. The method of claim 1 wherein each serving chamber of the pod is filled via a dispensing nozzle receiving supplement from a common manifold, the plurality of hoppers connected to the common manifold.

9. The method of claim 1 wherein each of the plurality of hoppers is controlled via one of an associated motor controlled valve and an associated screw-type delivery system to deliver a selected amount of the ingredient within the associated hopper for the customized nutritional supplement.

10. The method of claim 1 wherein the plurality of hoppers are controlled such that an ingredient composition of the nutritional supplement is variable between the plurality of serving chambers.

11. The method of claim 1 further comprising placing a plurality of unique identifiers on the pod, each unique identifier associated with a respective one of the plurality of serving chambers, each unique identifier indicative of an ingredient composition of the supplement to be contained with the respective one of the plurality of serving chambers.

12. The method of claim 1 further comprising sealing the nutritional supplement within the plurality of serving chambers of the housing by connecting at least one sealing member to the housing, the at least one sealing member extending over the plurality of serving chambers and being removable to open a selected one of the plurality of serving chambers to dispense supplement therein.

13. The method of claim 12 further comprising dispensing the supplement from one of the plurality of serving chambers of the pod by placing the pod in a dispensing machine, scanning at least one unique identifier, and selectively opening one of the plurality of serving chambers by removing the sealing member associated with the one of the plurality of serving chambers.

14. The method of claim 1 wherein the nutritional supplement comprises at least one of a vitamin, a mineral, a fiber, a fatty acid, a protein, an amino acid, an herbal medicine, a bodybuilding supplement, a pharmaceutical, a therapeutic, a medicine, a drug, and a treatment.

15. The method of claim 1 further comprising receiving at least one input from a user via an ordering interface; and providing an ingredient composition for the customized nutritional supplement to a controller of the filling station.

16. The method of claim 14 wherein the at least one input is selectable from a list containing a series of selection amounts for each ingredient in the supplement corresponding to a metering capability of the filling station.

17. A method for filling a pod comprising:

providing a pod having a housing defining a plurality of serving chambers arranged in an annular array and surrounding a drive hub;

receiving data indicative of a customized nutritional supplement for the pod to a controller of an automated filling station;

filling the customized nutritional supplement into at least one of the plurality of serving chambers of the pod via the automated filling station by controlling a plurality of hoppers of the filling station to dispense the customized supplement into the plurality of serving chambers of the pod, each hopper containing a corresponding ingredient available for the customized supplement;

wherein filling the pod further comprises filling a plurality of recesses in a formula plate of a filling fixture in the filling station with the nutritional supplement;

wherein filling the pod further comprises positioning the pod above the formula plate and aligning the plurality of serving chambers of the pod with a plurality of recesses via a locating feature supported by the formula plate; and wherein filling the pod further comprises placing a retention member of the filling fixture over the pod to retain the pod relative to the formula plate, and rotating the filling fixture one hundred and eighty degrees about a horizontal axis such that nutritional supplement within the plurality of recesses flows directly into the plurality of serving chambers.

18. The method of claim 17 wherein the formula plate comprises a series of shim plates, each shim plate having a series of apertures therethrough to collectively form the plurality of recesses.

19. A method for filling a pod comprising:

providing a pod having a housing defining a plurality of serving chambers arranged in an annular array and surrounding a drive hub;

receiving data indicative of a customized nutritional supplement for the pod to a controller of an automated filling station;

filling the customized nutritional supplement into at least one of the plurality of serving chambers of the pod via the automated filling station by controlling a plurality of hoppers of the filling station to dispense the customized supplement into the plurality of serving chambers of the pod, each hopper containing a corresponding ingredient available for the customized supplement;

positioning a plurality of sachets relative to the plurality of serving chambers; and individually sealing each sachet of the plurality of sachets;

wherein filling the pod further comprises filling the plurality of sachets.

* * * * *